United States Patent
Uchida et al.

(10) Patent No.: US 12,458,399 B2
(45) Date of Patent: Nov. 4, 2025

(54) POSTPARTUM UTERINE HEMORRHAGE DEVICE

(71) Applicant: ALYDIA HEALTH, INC., Menlo Park, CA (US)

(72) Inventors: Andy H. Uchida, Los Altos, CA (US); Piyush Arora, Fremont, CA (US); Amelia Degenkolb, San Luis Obispo, CA (US); Sara Della Ripa, San Luis Obispo, CA (US); Jan Segnitz, Morgan Hill, CA (US); Nathan Bair, San Luis Obispo, CA (US)

(73) Assignee: Alydia Health, Inc., Menlo Park, CA (US)

( * ) Notice: Subject to any disclaimer, the term of this patent is extended or adjusted under 35 U.S.C. 154(b) by 1056 days.

(21) Appl. No.: 17/311,724

(22) PCT Filed: Dec. 10, 2019

(86) PCT No.: PCT/US2019/065504
§ 371 (c)(1),
(2) Date: Jun. 8, 2021

(87) PCT Pub. No.: WO2020/123525
PCT Pub. Date: Jun. 18, 2020

(65) Prior Publication Data
US 2022/0022916 A1      Jan. 27, 2022

Related U.S. Application Data

(60) Provisional application No. 62/861,233, filed on Jun. 13, 2019, provisional application No. 62/777,642, filed on Dec. 10, 2018.

(51) Int. Cl.
*A61B 17/42* (2006.01)
*A61B 17/00* (2006.01)
(Continued)

(52) U.S. Cl.
CPC .... *A61B 17/4241* (2013.01); *A61B 17/12099* (2013.01); *A61B 17/12136* (2013.01);
(Continued)

(58) Field of Classification Search
CPC .................. A61B 17/42; A61B 17/12; A61B 17/12022–1204; A61B 17/12099;
(Continued)

(56) References Cited

U.S. PATENT DOCUMENTS

| | | |
|---|---|---|
| 1,928,992 A | 10/1933 | Clark et al. |
| 2,185,927 A | 1/1940 | Shelanski |

(Continued)

FOREIGN PATENT DOCUMENTS

| | | |
|---|---|---|
| CN | 2097618 U | 3/1992 |
| CN | 2116469 U | 9/1992 |

(Continued)

OTHER PUBLICATIONS

Balloon Uterine Stent, Cook Medical, Cook, 2017, 3 pages, [Online] [Retrieved on Dec. 21, 2017] Retrieved from the Internet <URL:https://www.cookmedical.com/products/wh_bus_webds/>.

(Continued)

*Primary Examiner* — Michelle J Lee
(74) *Attorney, Agent, or Firm* — Jordan IP Law, LLC

(57) ABSTRACT

An anti-hemorrhaging device includes an elongate body, a flexible looped segment, a shield, and an inflatable seal. The elongate body is configured to attach to a vacuum source. The flexible looped segment is attached to the elongate body includes a plurality of holes on an inner circumference thereof. The flexible looped segment is configured to be placed in a uterus. Activation of the vacuum source is configured to pull vacuum through the plurality of holes so as to collapse the uterus upon insertion of the elongate body into the uterus. The shield is folded around an exterior (Continued)

circumference of the looped portion and has edges that extend radially inwards relative to the flexible looped distal section. The shield is configured to prevent tissue from occluding the plurality of holes when vacuum is applied. The inflatable seal is attached to the elongate body and is configured to seal the uterus.

14 Claims, 26 Drawing Sheets

(51) Int. Cl.
  *A61B 17/12* (2006.01)
  *A61B 17/30* (2006.01)
  *A61B 90/00* (2016.01)
(52) U.S. Cl.
  CPC .............. *A61B 2017/00557* (2013.01); *A61B 2017/12004* (2013.01); *A61B 2017/306* (2013.01); *A61B 2017/4216* (2013.01); *A61B 2090/08021* (2016.02)
(58) Field of Classification Search
  CPC ... A61B 17/12131; A61B 17/30; A61B 90/06; A61B 2090/0801; A61B 2090/08021; A61B 2017/00535; A61B 2017/22051; A61B 2017/306; A61B 2017/4225; A61B 17/4241; A61B 17/12136; A61B 2017/00557; A61B 2017/12004; A61B 2017/4216
  See application file for complete search history.

(56) References Cited

U.S. PATENT DOCUMENTS

| | | | |
|---|---|---|---|
| 2,286,462 A | 6/1942 | Chaffin | |
| 2,400,251 A | 5/1946 | Nagel | |
| 2,483,851 A | 10/1949 | Smith | |
| 2,925,904 A | 2/1960 | Eichholz | |
| 2,981,255 A | 4/1961 | Heyns | |
| 3,062,215 A | 11/1962 | Heyns | |
| 3,517,665 A | 6/1970 | Sheldon | |
| 3,626,928 A | 12/1971 | Barringer et al. | |
| 3,670,732 A | 6/1972 | Robinson | |
| 3,774,613 A | 11/1973 | Woods, Jr. et al. | |
| 3,828,781 A | 8/1974 | Rothman | |
| 3,835,843 A | 9/1974 | Karman | |
| 3,848,602 A | 11/1974 | Gutnick | |
| 3,923,051 A | 12/1975 | Solchet | |
| 3,929,133 A | 12/1975 | Ragab | |
| 4,013,079 A | 3/1977 | Lindemann et al. | |
| 4,111,209 A | 9/1978 | Wolvek et al. | |
| 4,141,360 A | 2/1979 | Lasswell | |
| 4,217,904 A * | 8/1980 | Zahorsky | A61M 1/85 604/268 |
| 4,317,452 A * | 3/1982 | Russo | A61M 27/00 604/541 |
| 4,444,548 A | 4/1984 | Andersen et al. | |
| 4,533,345 A | 8/1985 | Louw | |
| 4,552,557 A | 11/1985 | Rangaswamy | |
| 4,563,183 A | 1/1986 | Barrodale et al. | |
| 4,573,965 A * | 3/1986 | Russo | A61M 27/00 604/128 |
| 4,681,123 A | 7/1987 | Valtchev | |
| 4,767,404 A | 8/1988 | Renton | |
| 4,784,654 A | 11/1988 | Beecher | |
| 4,807,625 A | 2/1989 | Singleton | |
| 4,925,452 A | 5/1990 | Melinyshyn et al. | |
| 4,950,232 A * | 8/1990 | Ruzicka | A61M 27/006 604/43 |
| 4,955,875 A | 9/1990 | Knowles | |
| 4,981,477 A | 1/1991 | Schon et al. | |
| 5,030,202 A | 7/1991 | Harris | |
| 5,100,395 A | 3/1992 | Rosenberg | |
| 5,104,377 A | 4/1992 | Levine | |
| 5,160,325 A | 11/1992 | Nichols et al. | |
| 5,242,438 A | 9/1993 | Saadatmanesh et al. | |
| 5,254,084 A | 10/1993 | Geary | |
| 5,360,414 A | 11/1994 | Yarger | |
| 5,431,173 A | 7/1995 | Chin et al. | |
| 5,451,208 A | 9/1995 | Goldrath | |
| 5,464,409 A | 11/1995 | Mohajer | |
| 5,472,435 A | 12/1995 | Sutton | |
| 5,569,284 A | 10/1996 | Young et al. | |
| 5,603,685 A | 2/1997 | Tutrone, Jr. | |
| 5,769,880 A | 6/1998 | Truckai et al. | |
| 5,800,414 A | 9/1998 | Cazal | |
| 5,807,282 A | 9/1998 | Fowler | |
| 5,928,249 A | 7/1999 | Saadat et al. | |
| 5,941,873 A | 8/1999 | Korenfeld | |
| 6,042,535 A | 3/2000 | Porter | |
| 6,350,463 B1 | 2/2002 | Herman et al. | |
| 6,443,947 B1 | 9/2002 | Marko et al. | |
| 6,506,149 B2 | 1/2003 | Peng et al. | |
| 6,508,815 B1 | 1/2003 | Strul et al. | |
| 6,641,575 B1 | 11/2003 | Lonky | |
| 6,676,680 B1 | 1/2004 | Packer | |
| 6,736,822 B2 | 5/2004 | McClellan et al. | |
| 7,247,141 B2 | 7/2007 | Makin et al. | |
| 7,325,546 B2 | 2/2008 | Burbank et al. | |
| 7,512,445 B2 | 3/2009 | Truckai et al. | |
| 7,708,716 B2 | 5/2010 | Shah | |
| 8,197,470 B2 | 6/2012 | Sharkey et al. | |
| 8,221,401 B2 | 7/2012 | Sharkey et al. | |
| 8,287,552 B2 | 10/2012 | Grillo | |
| 9,125,686 B2 | 9/2015 | Norred et al. | |
| 9,301,770 B2 | 4/2016 | Gruber | |
| 9,421,346 B2 | 8/2016 | Callahan et al. | |
| 9,550,014 B2 | 1/2017 | Norred et al. | |
| 9,763,731 B2 | 9/2017 | Dubois et al. | |
| 9,919,083 B2 | 3/2018 | Blin | |
| 10,064,651 B2 | 9/2018 | Norred et al. | |
| 2001/0014787 A1 * | 8/2001 | Toyokawa | A61M 39/284 604/164.01 |
| 2002/0010457 A1 | 1/2002 | Duchon et al. | |
| 2003/0064746 A1 | 4/2003 | Rader et al. | |
| 2003/0191452 A1 | 10/2003 | Meglin et al. | |
| 2004/0006331 A1 | 1/2004 | Shchervinsky | |
| 2004/0122352 A1 | 6/2004 | John | |
| 2004/0220550 A1 | 11/2004 | Schryver | |
| 2004/0249360 A1 * | 12/2004 | Spehalski | A61M 27/00 604/523 |
| 2005/0261663 A1 | 11/2005 | Patterson et al. | |
| 2007/0032814 A1 | 2/2007 | Hibler | |
| 2007/0149998 A1 | 6/2007 | Wicks et al. | |
| 2008/0045924 A1 | 2/2008 | Cox et al. | |
| 2008/0051708 A1 | 2/2008 | Kumar et al. | |
| 2008/0188863 A1 | 8/2008 | Chu | |
| 2008/0319472 A1 | 12/2008 | Shelley | |
| 2009/0048685 A1 | 2/2009 | Frigstad et al. | |
| 2009/0093795 A1 | 4/2009 | Koeper | |
| 2010/0069886 A1 | 3/2010 | Wilkes | |
| 2010/0168691 A1 * | 7/2010 | Long | A61M 25/003 604/319 |
| 2010/0191279 A1 | 7/2010 | Kassab et al. | |
| 2010/0198214 A1 * | 8/2010 | Layton, Jr. | A61B 17/42 606/213 |
| 2010/0228239 A1 | 9/2010 | Freed | |
| 2010/0274260 A1 | 10/2010 | D'Arpiany et al. | |
| 2011/0087337 A1 | 4/2011 | Forsell | |
| 2011/0098524 A1 | 4/2011 | Rojas | |
| 2011/0208178 A1 | 8/2011 | Truckai | |
| 2011/0276022 A1 * | 11/2011 | O'Day | A61M 25/0021 604/523 |
| 2012/0041419 A1 | 2/2012 | Blanchard et al. | |
| 2012/0071841 A1 | 3/2012 | Bengtson | |
| 2012/0172889 A1 | 7/2012 | Chin et al. | |
| 2013/0245637 A1 | 9/2013 | Norred et al. | |
| 2013/0266165 A1 | 10/2013 | Neumeyer | |
| 2013/0296816 A1 | 11/2013 | Greener | |
| 2014/0079241 A1 | 3/2014 | Chan et al. | |
| 2014/0163532 A1 | 6/2014 | Comnet et al. | |

(56) References Cited

U.S. PATENT DOCUMENTS

| | | |
|---|---|---|
| 2014/0200591 A1 | 7/2014 | Sullivan et al. |
| 2014/0228801 A1 | 8/2014 | Keeling |
| 2014/0228877 A1 | 8/2014 | Kassab et al. |
| 2015/0080861 A1 | 3/2015 | Ozer |
| 2015/0142032 A1 | 5/2015 | Scheib et al. |
| 2015/0165151 A1 | 6/2015 | Payton et al. |
| 2017/0035949 A1 | 2/2017 | Loske |
| 2017/0224379 A1 | 8/2017 | Carson et al. |
| 2017/0281231 A1* | 10/2017 | Langell ............ A61B 17/4241 |
| 2018/0055523 A1 | 3/2018 | Bair et al. |
| 2019/0083132 A1 | 3/2019 | Norred et al. |
| 2019/0216504 A1 | 7/2019 | Norred et al. |
| 2020/0352602 A1 | 11/2020 | Norred et al. |

FOREIGN PATENT DOCUMENTS

| | | |
|---|---|---|
| CN | 2149183 Y | 12/1993 |
| CN | 2254720 Y | 5/1997 |
| CN | 2415733 Y | 1/2001 |
| CN | 2464264 Y | 12/2001 |
| CN | 2467062 Y | 12/2001 |
| CN | 2559321 Y | 7/2003 |
| CN | 2565407 Y | 8/2003 |
| CN | 2633227 Y | 8/2004 |
| CN | 2662850 Y | 12/2004 |
| CN | 2933317 Y | 8/2007 |
| CN | 201185945 Y | 1/2009 |
| CN | 101366650 A | 2/2009 |
| CN | 201337472 Y | 11/2009 |
| CN | 201356633 Y | 12/2009 |
| CN | 201361088 Y | 12/2009 |
| CN | 202044560 U | 11/2011 |
| CN | 202146327 U | 2/2012 |
| CN | 202288422 U | 7/2012 |
| CN | 203122506 U | 8/2013 |
| CN | 106390212 A | 2/2017 |
| CN | 106821472 A | 6/2017 |
| CN | 206587003 U | 10/2017 |
| CN | 107427659 A | 12/2017 |
| CN | 206852626 U | 1/2018 |
| CN | 207220865 U | 4/2018 |
| GB | 839965 A | 6/1960 |
| GB | 1469584 A | 4/1977 |
| IN | 20030006513 | 1/2005 |
| IN | 5953CHE2014 | 2/2015 |
| IN | 4745CHE2015 | 8/2016 |
| JP | 2001513357 A | 9/2001 |
| JP | 2001510071 A5 | 1/2006 |
| JP | 2007523716 A | 8/2007 |
| JP | 2010246911 A | 11/2010 |
| JP | 2015512275 A | 4/2015 |
| JP | 2018533461 A | 11/2018 |
| JP | 2019531864 A | 11/2019 |
| KR | 20010002164 A | 1/2001 |
| RU | 2113246 C1 | 6/1998 |
| RU | 98112 U1 | 10/2010 |
| RU | 102509 U1 | 3/2011 |
| RU | 2429792 C1 | 9/2011 |
| RU | 244003802 | 1/2012 |
| SU | 1426560 A1 | 9/1988 |
| SU | 1431746 A1 | 10/1988 |
| WO | WO2001/080788 A2 | 11/2001 |
| WO | WO2011/097350 A1 | 8/2011 |
| WO | WO2012/137894 A1 | 10/2012 |
| WO | WO2020/123525 A1 | 6/2020 |
| WO | WO2021/016564 A1 | 1/2021 |

OTHER PUBLICATIONS

Ebb—Clinical Innovations—forMom. forBaby. forLife, Clinical Innovations, LLC, 2016, 6 pages, [Online] [Retrieved on Dec. 21, 2017] Retrieved from the Internet <URL:http://clinicalinnovations.com/portfolio-items/ebb/>.

Ebb, Complete Tamponade System, Clinical Innovations, LLC, undated, 2 pages, [Online] [Retrieved on Dec. 21, 2017] Retrieved from the Internet <URL: http://clinicalinnovations.com/wp-content/uploads/2017/04/056-0086-Rev.-B.pdf>.

Hofmeyr, J.; Uterine suction devices: Review of literature and potential role; Effective care research unit, Univ. of the Witwatersrand/Fort Hare/Eastern Cape Dept. of Health; 22 pages: known of at least by Nov. 2018.

Manage Postpartum Hemorrhage, Bakri, Postpartum Balloon With Rapid Instillation Components, Cook, Mar. 2017, 4 pages, [Online] [Retrieved on Dec. 21, 2017] Retrieved from the Internet <URL: https://www.cookmedical.com/data/resources/RH-D28438-EN-F_M3_1489434681697.pdf>.

Panicker, T.N.V., "Panicker's Vacuum Suction Haemostatic Device for Treating Post-Partum Haemorrhage," The Journal of Obstetrics and Gynecology of India, Mar.-Apr. 2017, pp. 150-151, vol. 67, No. 2, [Online] [Retrieved on Mar. 26, 2018] Retrieved from the Internet <URL:http://www.jogi.co.in/march_april_17/pdf/14_jat.pdf>.

Goates, T. et al.; Poster: UVAC Uterine Vacuum Assisted Contraction, University of Utah Health Science, Center for Medical Innovation, Bench to Bedside, Apr. 2016.

Postpartum Hemorrhage PPH Bakri Style Balloon BT—Cath Balloon Tamponade Catheter, Utah Medical Products Inc., 1999-2017, 3 pages, [Online] Retrieved from the Internet <URL: http://www.utahmed.com/bt-cath.html>.

Purwosunu et al.; Control of postpartum hemorrhage using vacuum-induced uterine tamponade; Obstetrics and Gynecology; 128(1); pp. 33-36; Jul. 2016.

Ram, S. et al., "Vacuum Retraction of Uterus for the Management of Atonic Postpartum Hemorrhage," IOSR Journal of Dental and Medical Sciences (IOSR-JDMS), Nov. 2014, pp. 15-19, vol. 13, Issue 11, Ver. III. May be Retrieved at <URL: https://www.researchgate.net/publication/284005732_Vacuum_retraction_of_ute rus_for_the_management_of_atonic_postpartum_hemorrhage>.

Shields et al.; ACOG Practice Bulletin—Clinical Management Guidelines for Obstetrician-Gynecologists; Postpartum Hemorrhage; Obstetrics and Gynecology; 130(4); pp. e168-e186; Oct. 2017.

Video of B2B Competition 2016, Bench 2 Bedside Student Program; Can be Viewed at <URL: http://uofuhealth.utah.edu/center-for-medical-innovation/backup_folder/index-old.php>. [PDF of program contents enclosed].

Dr. Panicker's PPH Suction Device—INSTASTOP: (Screenshot) 1 page; retrieved from the internet at YouTube (https://www.youtube.com/watch?v=a-QlpkeT3Gg); Published Jan. 26, 2017.

Panickers PPH Suction Device; (Screenshot) 1 page; retrieved from the internet at YouTube (https://www.youtube.com/watch?v=KDa_tl_p3qVM); Published Apr. 9, 2015.

Panicker's PPH Suction Device; (Screenshot) 1 page; retrieved from the internet at YouTube (https://www.youtube.com/watch?v=uQYoWEbWJOg); Published Oct. 25, 2016.

Webinar on: Vacuum Retraction Cannula for Managing Atonic PPH; (Screenshot) 1 page; retrieved from the internet at YouTube (https://www.youtube.com/watch?v=FSpn8JLSQIA); Published Oct. 25, 2016.

Office Action for Japanese Patent Application No. 2021-555152, mailed Oct. 3, 2023, 3 pages.

Green Journal, "Animated Simulation of Vacuum-Induced Uterine Tamponade for Treatment of Postpartum Hemorrhage", Jun. 20, 2016, 2 pages, retrieved from <youtube.com/watchv=46Wiei8sUgM>.

European Search Report for EPO Application No. 19895990.0, mailed Aug. 5, 2022, 10 pages.

Office Action for Eurasian Patent Office Application No. 202191636 (Jan. 12, 2022).

* cited by examiner

POSTPARTUM UTERINE HEMORRHAGE DEVICE

CROSS REFERENCE TO RELATED APPLICATIONS

This application claims priority to U.S. Provisional Application No. 62/861,233, titled "Postpartum Uterine Hemorrhage Device" and filed on Jun. 13, 2019, the entirety of which is incorporated by reference herein. This application also claims priority to U.S. Provisional Patent Application No. 62/777,642 titled "Postpartum Uterine Hemorrhage Device" and filed Dec. 10, 2018, the entirety of which is incorporated by reference herein.

This application may also be related to U.S. Patent Publication No. 2019/083132, titled "Uterine Hemorrhage Controlling System and Method" and filed Jul. 13, 2018, the entirety of which is incorporated by reference herein.

This application may also be related to U.S. Patent Publication No. 2018/0055523, titled "Uterine Hemorrhage Controlling System and Method" and filed Aug. 22, 2017, the entirety of which is incorporated by reference herein.

INCORPORATION BY REFERENCE

All publications and patent applications mentioned in this specification are herein incorporated by reference to the same extent as if each individual publication or patent application was specifically and individually indicated to be incorporated by reference.

BACKGROUND

Postpartum hemorrhage, defined as excessive blood loss after birth, is the leading cause of maternal death in the world, claiming the lives of over 125,000 mothers every year. Inability to control postpartum bleeding can require a woman to receive multiple blood transfusions, and in severe cases, a full hysterectomy or death. Therefore, it is desirable to control such postpartum bleeding, if possible, at its onset. The cause of postpartum hemorrhage, in approximately 80% of cases, is uterine atony, which is the inability of the woman's uterus to contract after delivering the child. Risk factors for uterine atony include prolonged stage of labor, preeclampsia, and multiparity. Accordingly, a system that is able to rapidly induce uterine contraction, which may reduce or entirely stop uterine hemorrhaging, is needed.

SUMMARY

In general, in one embodiment an anti-hemorrhaging device includes an elongate body, a flexible looped segment, a shield, and an inflatable seal. The elongate body is configured to attach to a vacuum source. The flexible looped segment is attached to the elongate body includes a plurality of holes on an inner circumference thereof. The flexible looped segment is configured to be placed in a uterus. Activation of the vacuum source is configured to pull vacuum through the plurality of holes so as to collapse the uterus upon insertion of the elongate body into the uterus. The shield is folded around an exterior circumference of the looped portion and has edges that extend radially inwards relative to the flexible looped distal section. The shield is configured to prevent tissue from occluding the plurality of holes when vacuum is applied. The inflatable seal is attached to the elongate body and is configured to seal the uterus.

This and other embodiments can include one or more of the following features. The flexible looped segment can be configured to collapse for delivery and to self-expand to an expanded looped shape. The shield can extend around 270°-320° of the exterior circumference of the flexible looped distal section. The shield can extend radially inwards by a distance of between 0.02" and 0.020". The plurality of holes can include 10-20 holes. The seal can include a disk-shaped central portion and tapered proximal and distal ends. The device can further include a valved port in fluid communication with the elongate body. The valved portion can be configured to provide inflation fluid to the inflatable seal. The valve can include a check-valve.

In general, in one embodiment, an anti-hemorrhaging device includes a first elongate tube, a second elongate tube, a connector, and a plurality of holes. The first elongate tube has a first central channel. The second elongate tube has a second central channel and is joined with and parallel to the first elongate tube so as to form an axial crevice between the first and second elongate tubes. The connector is configured to connect the first and second central channels to a vacuum source. The plurality of holes are positioned along the crevice. Each of the plurality of holes extends from an outer surface of the device and connects to both the first central channel and the second central channel. Activation of the vacuum source is configured to pull vacuum through the plurality of holes so as to collapse a uterus upon insertion of the device into the uterus.

This and other embodiments can include one or more of the following features. Each of the plurality of holes can include an elongate shape along the crevice. Each of the plurality of holes can include a round shape along the crevice. The anti-hemorrhaging device can further include a seal positioned along the first and second elongate tubes. The seal can have a disk-shaped central portion and tapered proximal and distal ends. The crevice can include a depth of 0.02" to 0.20". An angle of the crevice can be between 10 and 80 degrees. A ratio of a width of the device to a height of the device can be between 1.4 and 2.3 where the width and height are perpendicular to the axial crevice. A ratio of a height of the device to a width of the device can be between 1.4 and 2.3 where the width and height are perpendicular to the axial crevice. A ratio of a height of the device to a width of the device can be approximately 1 where the width and height are perpendicular to the axial crevice. Each of the plurality of holes can extend completely through the crevice from the outer surface to a second opposite outer surface. The anti-hemorrhaging device can further include a tapered distal tip.

In general, in one embodiment, an anti-hemorrhaging device includes an elongate body and a seal. The elongate body is configured to attach to a vacuum source having a plurality of holes. Activation of the vacuum source is configured to pull vacuum through the plurality of holes so as to collapse a uterus upon insertion of the elongate body into the uterus. The seal is attached to the elongate body and configured to seal the uterus. The seal includes a proximal ring and a distal skirt and is configured to have a substantially conical shape.

This and other embodiments can include one or more of the following features. The seal can be proximal to the holes. An angle of the skirt relative to the elongate body can be between 30 and 60 degrees. The ring can have a diameter of 2-10 mm. The ring can be stiffer than the skirt. The ring can be thicker than the skirt. The skirt can have a thickness of 1-1.5 mm. The ring can be in a plane that is approximately perpendicular to a longitudinal axis of the elongate body.

The proximal ring can be configured to press against tissue of a vaginal canal or cervical wall. The seal can be configured to invert when the elongate body is pulled proximally. The skirt can be attached to an outermost diameter of the proximal ring when the seal is inverted. The thickness of the skirt can vary from a proximal end to a distal end thereof. A thickness of the skirt can be uniform from a proximal end to a distal end thereof.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Described herein are uterine hemorrhage devices, systems, and methods that create a vacuum within the postpartum uterine space while evacuating blood and/or clots therefrom. The vacuum can advantageously encourage physical collapse of the uterine space, leading to inducement of tone in the uterus to affect control of the hemorrhage.

Figure 1A:
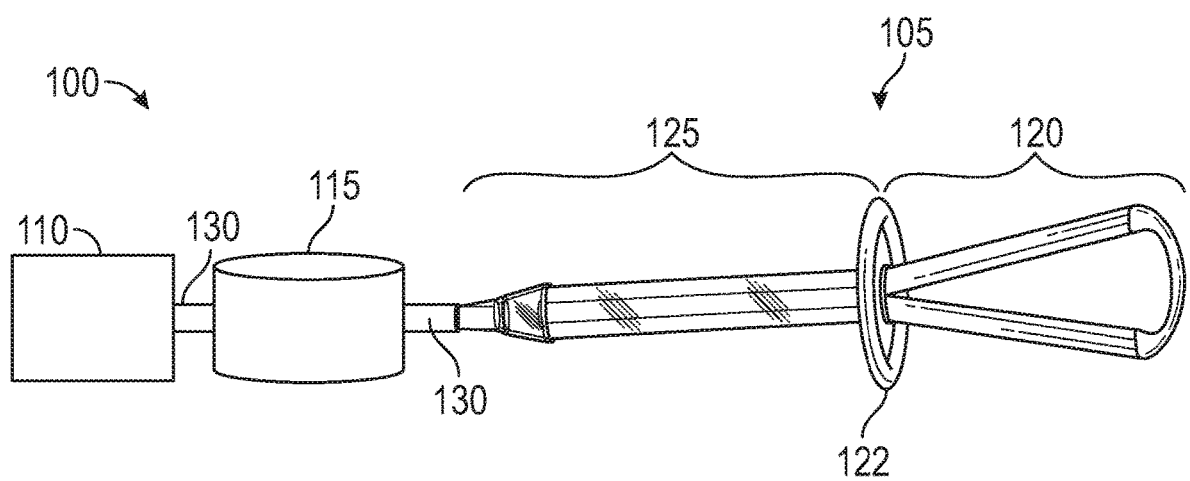
FIG. 1A illustrates an exemplary system for controlling uterine hemorrhaging.

FIG. 1A illustrates an exemplary system 100 for controlling uterine hemorrhaging, according to an embodiment. The system 100 functions to reduce or entirely stop uterine hemorrhaging, which may occur after childbirth when a woman experiences uterine atony, wherein the uterus fails to contract. Controlling uterine hemorrhaging substantially reduces the total blood lost from the uterus and may reduce a woman's need for a blood transfusion or a hysterectomy. In the embodiment of FIG. 1A, the system 100 facilitates contraction of the uterus by sealing an opening to the uterus and providing a pressure change within the uterus. Changing the pressure generates a vacuum within the uterus that results in a uniform mechanical stimulus to the uterine wall in order to facilitate tamponade and contractile movement of the tissue. In the embodiment of FIG. 1A, the system 100 includes an insertable device 105, a pump 110, and a collection container 115.

Figure 33:
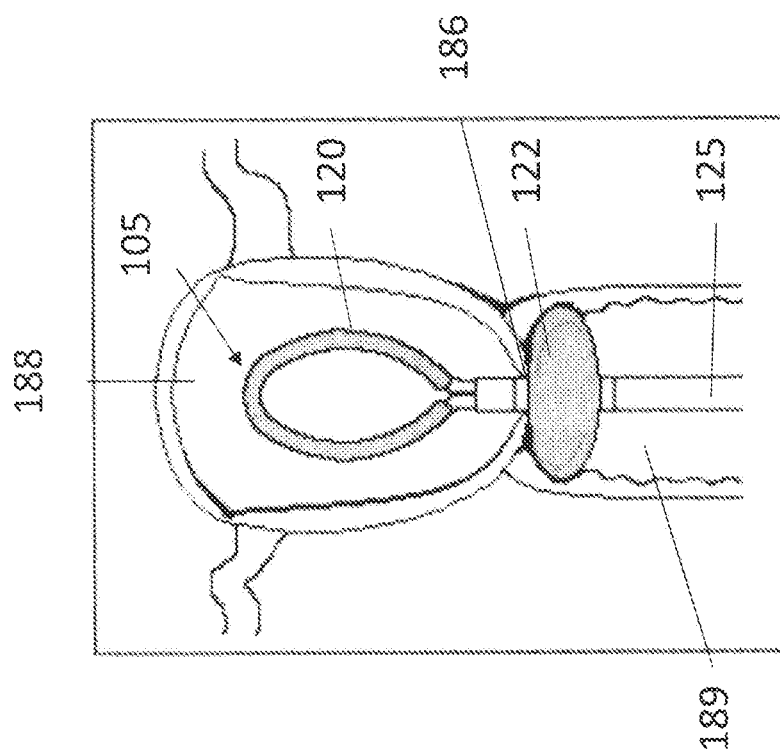
FIG. 33 shows exemplary placement of an insertable device within the body for controlling uterine hemorrhaging.

The insertable device 105 is configured to be inserted into the uterus to transmit the pressure change provided by the pump 110. In the embodiment of FIG. 1A, the insertable device 105 is delivered transvaginally (through the vagina) such that a distal portion 120 of the insertable device 105 is positioned within the uterus while a proximal portion 125 of the insertable device 105 remains external to the uterus. The distal portion 120 may have a flexible structure such that it conforms to the anatomy of the uterus. A seal 122 between the distal portion 120 and the proximal portion 125 can create a seal at the opening of the uterus. The proximal portion 125 of the insertable device 105 couples to the pump 110. FIG. 33 shows exemplary positioning of the seal 122 within the vaginal canal 189 at the opening 186 of the cervix such that the distal portion 120 is positioned within the uterus 188. In some embodiments, the insertable device 105 may have a sheath that facilitates insertion of the insertable device 105 into the uterus and may additionally prevent a premature connection of the airflow from the pump 110 to the uterus.

Figure 35:
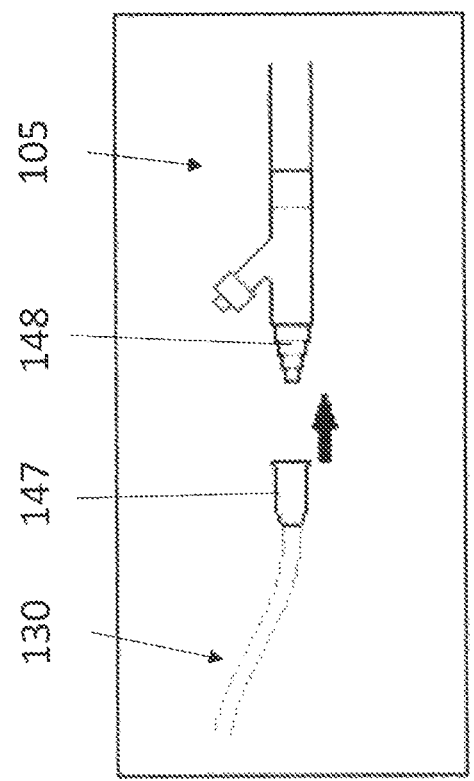
FIG. 35 shows exemplary connection tubing for an insertable device for controlling uterine hemorrhaging.

The pump 110 creates a pressure change that generates a vacuum within the uterus. In the embodiment of FIG. 1A, the pump 110 is coupled to the proximal portion 125 of the insertable device 105. In some embodiments, a connection tubing 130 attaches to the proximal portion 125 and to the pump 110, thereby coupling the pump 110 and the insertable device 105. In some embodiments, the collection chamber 115 is positioned along the connection tubing 130 between the pump 110 and the proximal portion 125 so as to prevent blood from entering the pump 110, as described further below. In some embodiments, the connection tubing 130 includes a directional control valve that allows fluid to flow in one direction and prevents fluid from flowing in the opposite direction. Exemplary connection tubing 130 is shown in FIG. 35. Connector 147 on the tubing 130 is configured to mate with connector 148 on the insertable device 105.

When actuated, the pump 110 creates an airflow that is transmitted through the channels and/or openings of the insertable device 105 to the uterus. In general, vacuum pumps are configured to remove molecules from a sealed volume in order to leave behind a partial vacuum. Since the uterus is sealed upon placement of the device 105 (e.g., by the seal 122), the airflow by the pump 110 decreases the pressure inside the uterus, causing the uterine pressure to drop lower than the atmospheric pressure outside of the uterus (e.g., a pressure of less than 1 atm). The vacuum ensures that the airflow travels in a single direction from the uterus and through the insertable device 105 towards the pump 110. In some embodiments, the pump 110 can be configured to provide a vacuum pressure of 60-150 mmHg, such as 70-90 mmHg, such as approximately 80 mmHg. The vacuum inside the uterus facilitates tamponade, arterial vessel constriction, and contractile movement of the uterine wall by providing a uniform mechanical stimulus. In addition, generating a vacuum allows biological materials within the uterus to be removed. Biological materials may include blood, tissue, etc. The pump 110 may be power (automatically) operated or manually operated. In the embodiments in which the pump 110 is manually operated, the pump 110 may create a vacuum within the uterus when in a first state, and in a second state, the pump 110 may draw biological materials into the collection container 115 while maintaining the vacuum within the uterus.

The collection container 115 collects the biological materials removed from the uterus. As illustrated in FIG. 1A, the collection container 115 can be connected in-line with the pump 110. The proximal portion 125 of the insertable device 105 couples to the collection container 115 and the pump 110 via the connection tubing 130. In this embodiment, the fluid (e.g., air, biological materials, etc.) flows through the connection tubing 130 towards the pump 110 when the pump 110 is activated. The biological material is removed from the connection tubing 130 prior to reaching the pump 110 and collects in the collection container 115. Collecting biological materials from the uterus may allow a user to monitor and measure the amount of blood loss due to uterine hemorrhaging. Monitoring the blood loss additionally allows the user to determine whether, when, and/or to what extent uterine contraction has occurred.

Figure 32:
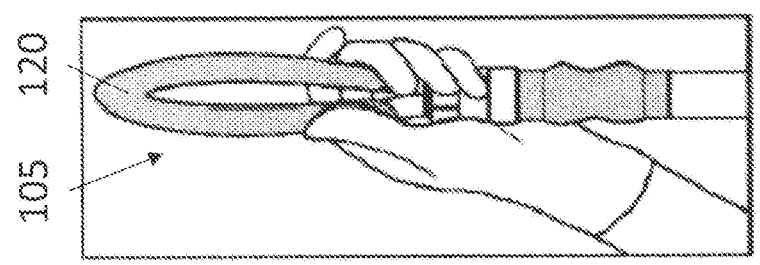
FIG. 32 shows collapse of the distal portion of an insertable device for controlling uterine hemorrhaging.

In some embodiments, the system 100 may be used to prevent postpartum hemorrhage in addition to monitoring and/or treating it. For example, the system 100 may be used in any woman after birth to aid uterine contraction. The flexibility of the insertable device 105 allows a healthcare provider (e.g., nurse, physician, surgeon, etc.) to palpate a woman's uterine tissue abdominally in order to detect if and/or when the uterus has contracted. In addition, the flexibility of the insertable device 105 allows the insertable device 105 to be collapsed, flexed, and positioned while other vaginal wall or tissue repair surgical procedures are being conducted. FIG. 32 shows the distal portion 120 of the device 105 manually collapsed for insertion into the uterus.

In some embodiments, the insertable device 105 may be configured for insertion into a vaginal canal or a cervical canal (e.g., the upper vaginal canal, the cervical external OS, or tissue proximate thereto) such that the insertable device 105 remains external to the uterus. The seal 122 can create a seal between a vaginal opening or a cervical opening and the uterus. Creating the seal allows the airflow by the pump 110 to decrease the pressure inside the uterus, causing the uterine pressure to drop lower than the atmospheric pressure outside of the uterus and generating a vacuum inside the uterus. As previously described, this facilitates tamponade, arterial vessel constriction, and contractile movement of the uterine wall by providing a uniform mechanical stimulus.

Figure 1B:
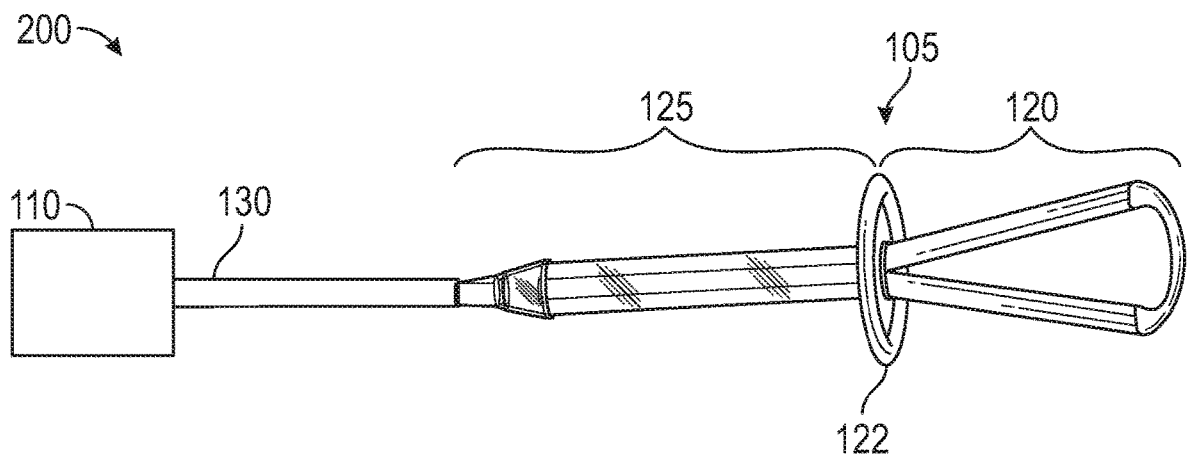
FIG. 1B illustrates another exemplary system for controlling uterine hemorrhaging.
Figure 2A:
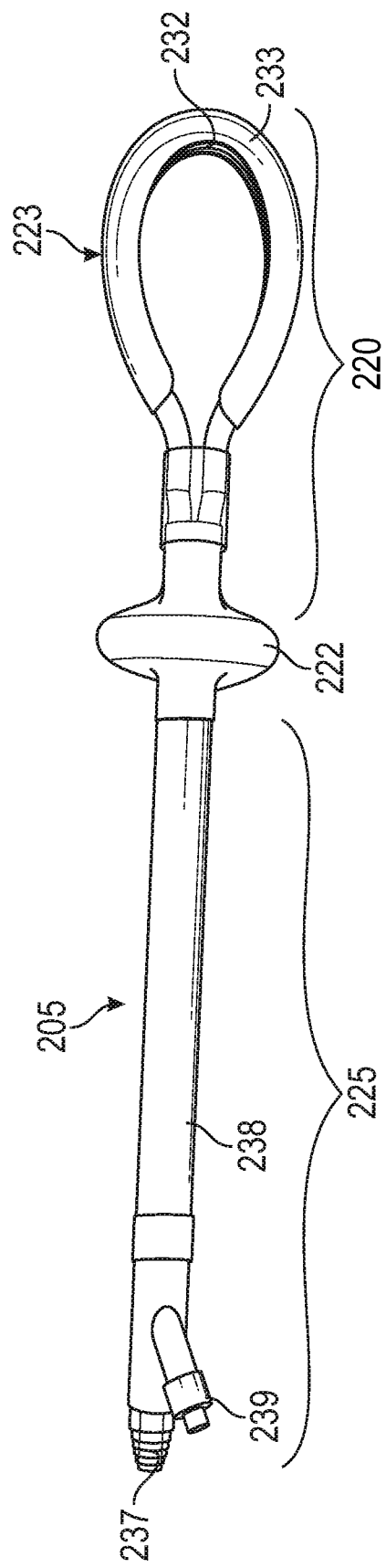
FIG. 2A is a perspective side view of an exemplary insertable device for controlling uterine hemorrhaging.
Figure 2B:
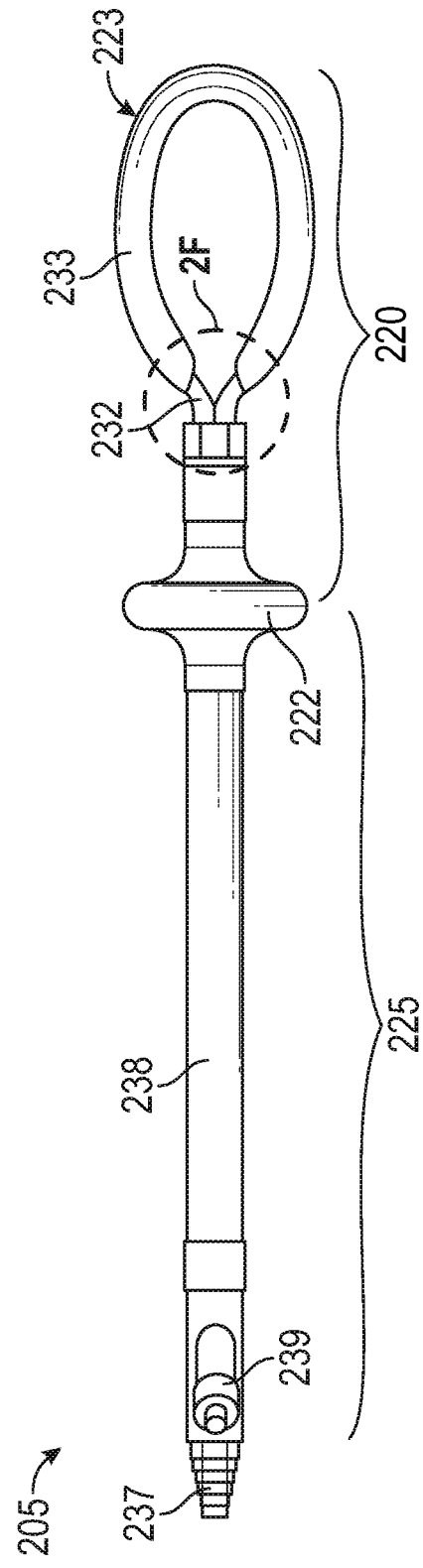
FIG. 2B is another side perspective view of the insertable device of FIG. 2A.
Figure 2C:
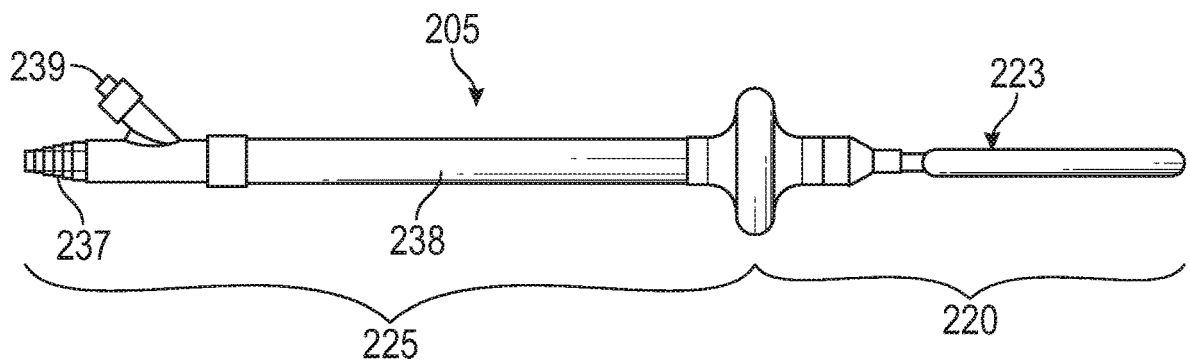
FIG. 2C is another side perspective view of the insertable device of FIG. 2A.
Figure 2D:
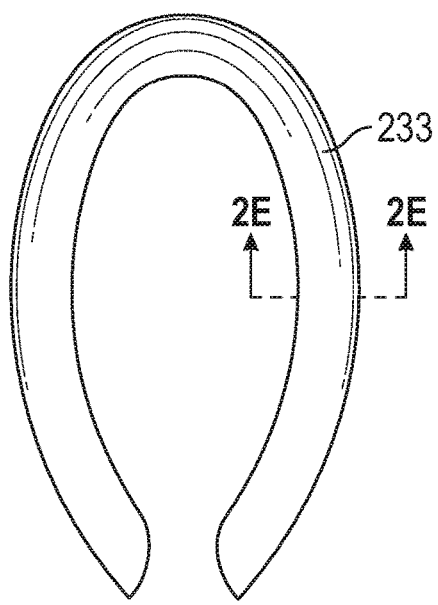
FIG. 2D is a perspective view of the shield of the insertable device of FIG. 2A.
Figure 2E:
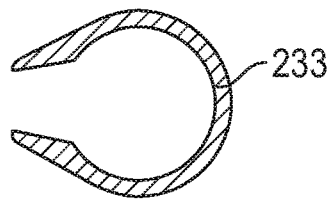
FIG. 2E is a cross-sectional view of the shield if the insertable device of FIG. 2A.
Figure 2F:
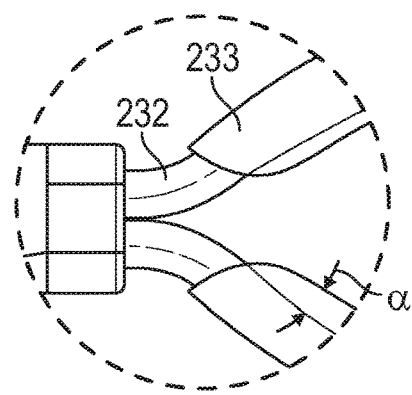
FIG. 2F is a close-up of the insertable device of FIG. 2A.
Figure 2G:
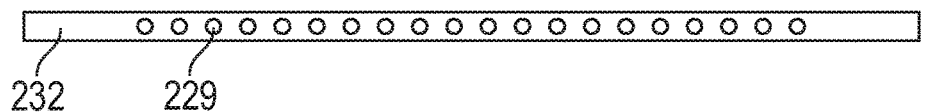
FIG. 2G is a flattened view of the inner circumference of the looped portion of the insertable device of FIG. 2A.
Figure 2H:
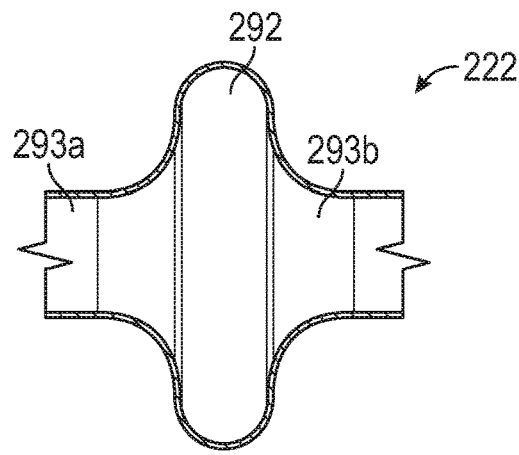
FIG. 2H is a side view of the seal of the insertable device of FIG. 2A.
Figure 2I:
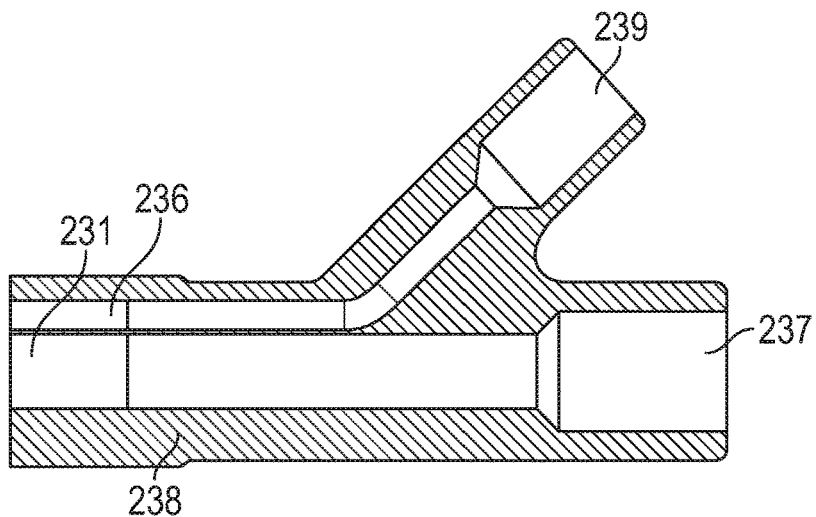
FIG. 2I is a cross-sectional view of the proximal end of the insertable device of FIG. 2A.

FIG. 1B illustrates a system 200 for controlling uterine hemorrhaging, according to an additional embodiment. The system 200 is similar to system 100 except that it does not include a separate collection chamber. Thus, the system 200 includes an insertable device 105 and a pump 110. The proximal portion 125 of the insertable device 105 couples to the pump 110 via the connection tubing 130. In this embodiment, the collection container can be integrated with the pump 110 such that the fluid (e.g., air, biological materials, etc.) flows through the connection tubing 130 into the pump 110, in which the biological materials are collected into a separate compartment of the pump 110. The compartment that collects the biological material may be removable from the pump 110. This may assist a healthcare provider in monitoring the amount of biological material collected.

A close-up of another embodiment of an insertable device 205 similar to device 105 is shown in FIGS. 2A-2I. The insertable device 205 includes a proximal portion 225, a distal portion 220, and a seal 222 therebetween.

Figure 34:
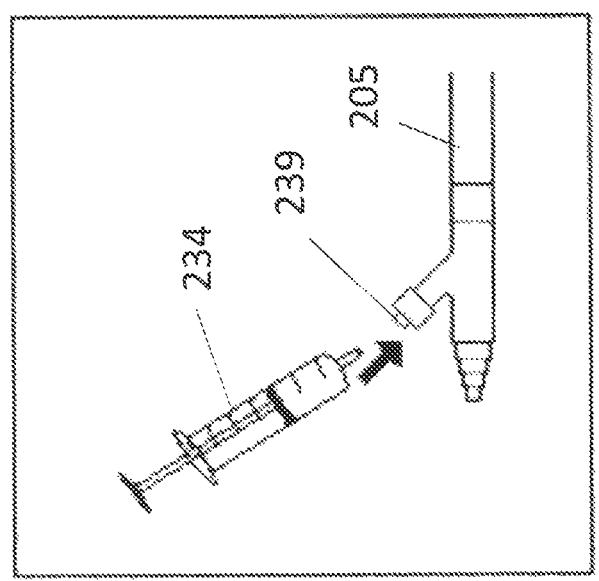
FIG. 34 shows a syringe used to introduce inflation fluid into an insertable device for controlling uterine hemorrhaging.

The proximal portion 225 includes an elongate body 238 or shaft housing the vacuum channel 231, a connector 237 for connection of the channel 231 to the pump, an inflation channel 236, and a valved port 239 for introduction of inflation medium to the seal 222 via the inflation channel 236. In some embodiments, the inflation channel 236 and vacuum channel 231 can run next to and/or in parallel with one another. The valve in valved port 239 can be, for example, a check valve that prevents fluid flow therethrough when not engaged by a syringe and opens to allow fluid therethrough when engaged with the syringe. FIG. 34 shows an exemplary syringe 234 configured to be inserted into valved port 239 for introduction of inflation medium.

Referring back to FIGS. 2A-2I, the distal portion 220 includes a flexible looped segment 223 that is configured to collapse for delivery to the uterus and then self-expand to the looped shape for conformation to the uterus. Further, the looped segment 223 includes an inner looped portion 232 and a shield 233. The inner looped portion 232 is continuous with and fluidically connected to the proximal portion 225. The inner looped portion 232 includes a plurality of holes 229 on the inner circumference thereof so as to provide vacuum therethrough (via connection to vacuum channel 231). For example, there can be 10-30 holes 229, such as 20 holes 229. The plurality of holes 229 can help provide redundancy should one or more holes become blocked during use. A shield 233 can conform to and be folded around the exterior circumference of the inner looped portion 232. For example, the shield 233 can extend around 270°-320° of the outer circumference of the inner looped portion 232. Further, the edges of the shield 233 can extend radially inwards relative to the inner looped portion 232 by a distance of 0.02" to 0.20", such as 0.04" to 0.15", such as approximately 0.08". The overhanging edges of the shield 233 can advantageously help protect the holes 229 from being occluded by tissue when vacuum is pulled therethrough.

The seal 222 can have a disk-shaped central portion 292 with tapered proximal and distal ends 293a,b. The seal 222 can be, for example, an inflatable balloon that is inflated via valved port 239. A volume of fluid, such as 30-200 cc, such as 40-120 cc, such as approximately 60 cc, can be used to inflate the seal 222.

In some embodiments, the insertable device (e.g., for use with system 200) can have a different shape (i.e., not be loop-shaped) and/or can be used without a separate shield. For example, FIGS. 3-13 show a variety of different exemplary insertable devices. The devices in FIGS. 3-13 can be designed to allow suction of fluid therearound (via a plurality of different holes) while having ridges and/or lips to prevent tissue and large pieces of clot from getting close enough to the holes to block off flow. The plurality of holes can advantageously both allow redundancy should some holes become plugged and distribute the vacuum load across the holes to prevent plugging of holes by tissue and/or clots. All of the devices shown in FIGS. 3-13 can, for example, be extruded from a single material (e.g., a thermoplastic materials such as polyurethane). Such a single extrusion can advantageously keep the cost of the design down while providing flexibility and stiffness. In some embodiments, the devices shown in FIGS. 3-13 can be made of multiple extrusions and/or molded parts of different durometers that are melted together for optimal design. The holes in the extruded parts can be formed, for example, by drilling, punching, laser, or water jet cutting.

Figure 3:
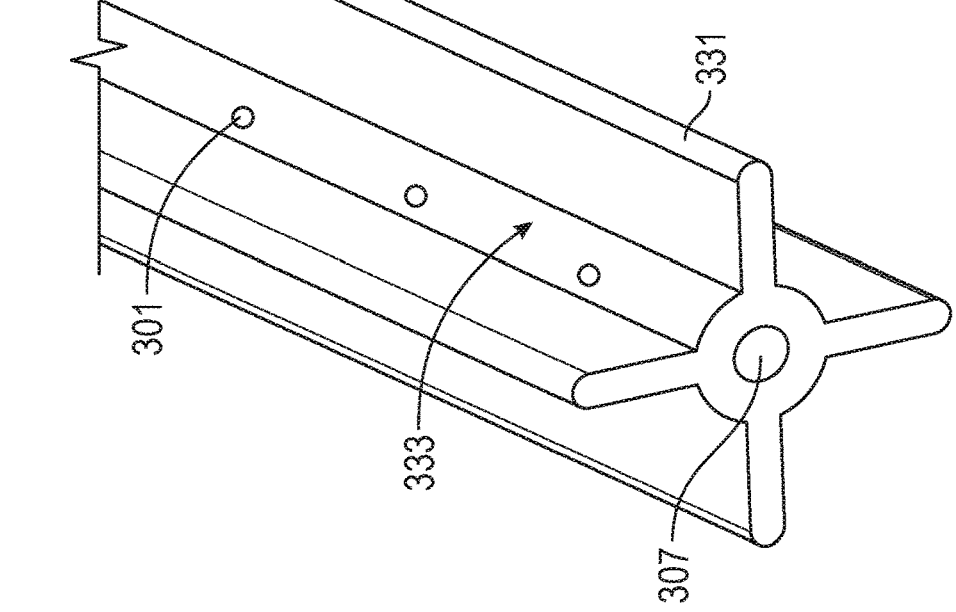
FIG. 3 is a perspective view of another exemplary insertable device for controlling uterine hemorrhaging.

FIG. 3 shows an exemplary insertable device 305. The device 305 includes an elongate shaft 333 that is substantially linear (i.e., is not looped). A plurality of holes 301 extend in the sidewall of the shaft 333 from a central vacuum channel 307 to the exterior thereof (i.e., for application of vacuum therethrough). Wings or ridges 331 extend radially from and along the length of the shaft 333. The ridges 331 are angled relative to one another so to as to form substantially v-shaped grooves therebetween extending the length of the shaft 333. The outermost edges of the ridges 331 can be rounded and/or atraumatic. In some embodiments, and shown in FIG. 3, there can be four ridges 331 positioned such that they give the device 305 a substantially "X" cross-sectional shape. Further, the holes 301 can be positioned between the ridges 331 (e.g., at the base or apex of the v-shaped grooves). The ridges 331 can help prevent suction of tissue against the holes 301, thereby keeping the holes 301 clear for application of vacuum and removal of blood from the uterus. Further, the holes 301 can be positioned in alternating and/or different locations along the longitudinal axis of the shaft 333 (i.e., holes in neighboring grooves can be at different axial positions) so as to both help prevent tissue clogging and maintain stability of the device 305.

Figure 4:
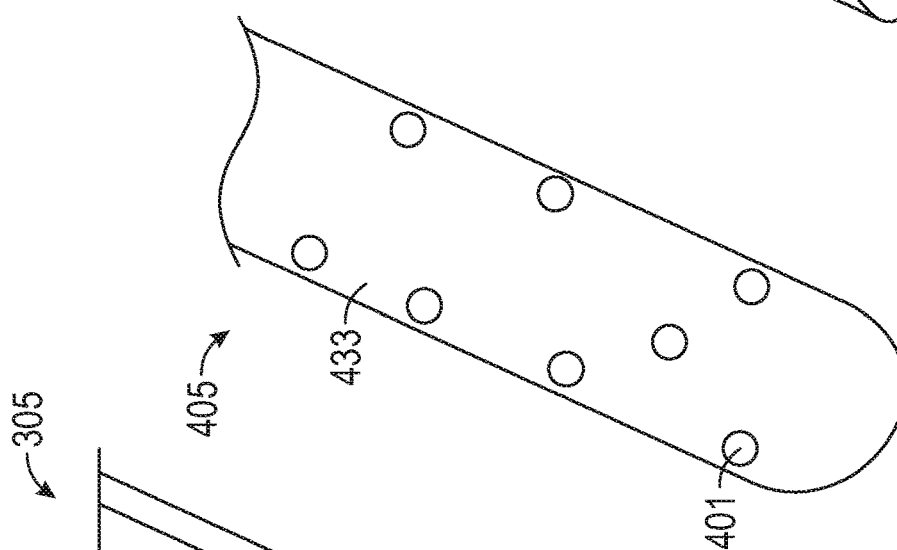
FIG. 4 is a perspective view of another exemplary insertable device for controlling uterine hemorrhaging.

FIG. 4 shows another exemplary insertable device 405. The device 405, like device 305, includes a substantially linear shaft 433 with a plurality of holes 401 extending through a side-wall thereof. The holes 401 are randomly positioned along the shaft 433. Further, the device 405 can include ridges thereon and/or raised features around the holes 401 to help prevent tissue from blocking the holes 401 when vacuum is applied.

Figure 5:
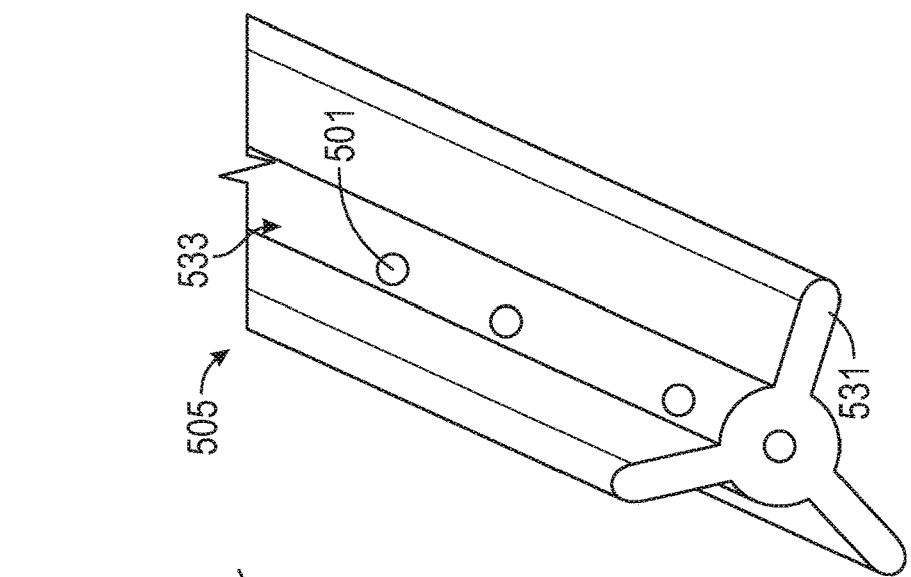
FIG. 5 is a perspective view of another exemplary insertable device for controlling uterine hemorrhaging.

FIG. 5 shows another exemplary insertable device 505. The device 505 is similar to device 305, but the shaft 533 includes only three longitudinal ridges 531 with holes 501 therebetween.

Figure 11:
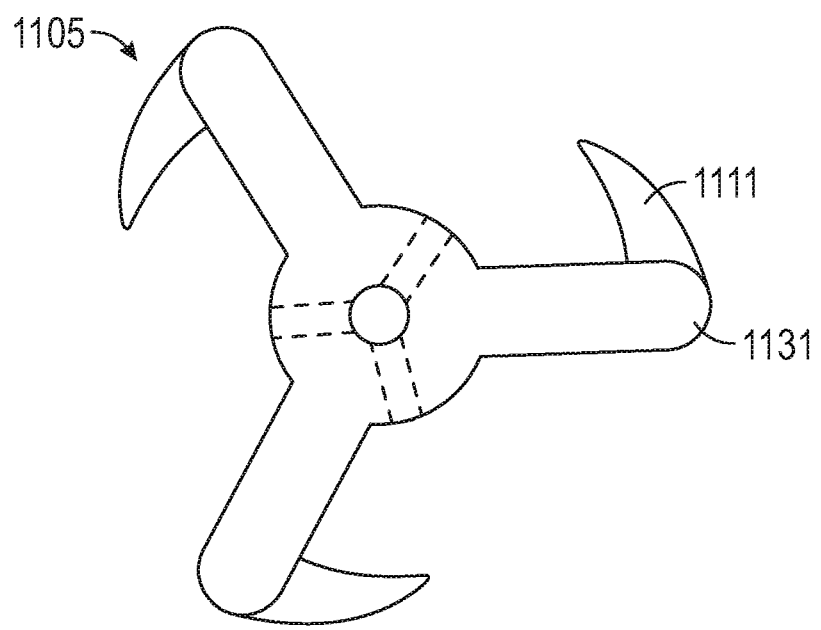
FIG. 11 is a cross-section of another device for controlling uterine hemorrhaging.

FIG. 11 shows another exemplary device 1105 that is similar to device 505, but includes sharp knife-like edges 1111 extending radially from each of the ridges 1131. The edges 1111 curve in to point along the circumference of the device 1105 so as to help cut through a clot when twisted or rotated (e.g., in the clockwise direction in FIG. 11).

Figure 6A:
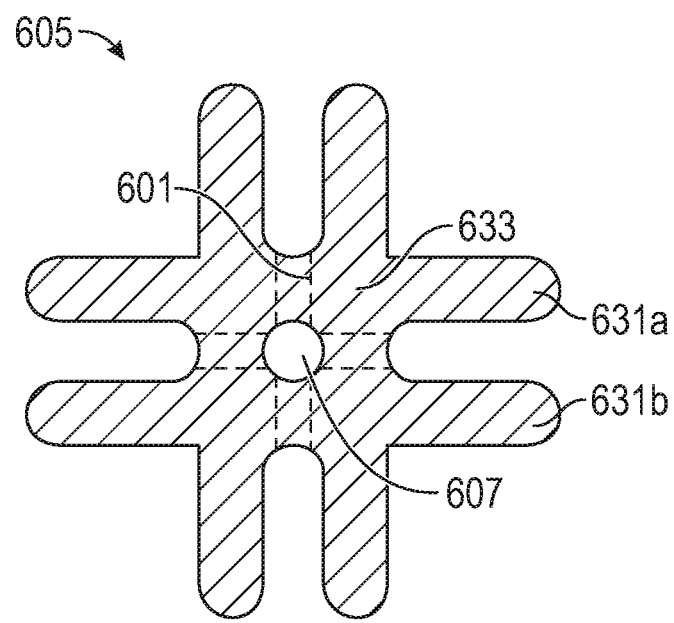
FIG. 6A is a cross-section of another device for controlling uterine hemorrhaging.
Figure 6B:
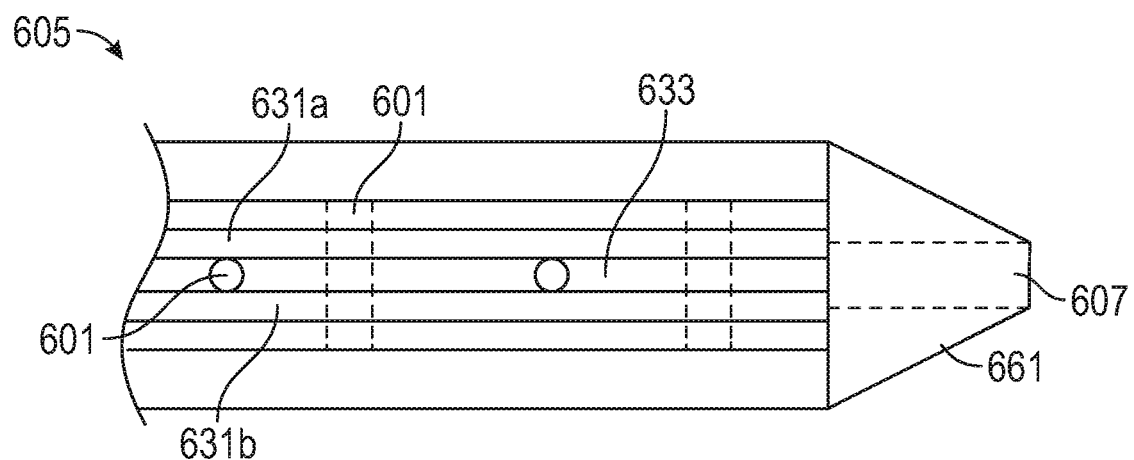
FIG. 6B shows a side view of the insertable device of FIG. 6A.

FIGS. 6A-6B show another exemplary insertable device 605. The device 605 is similar to device 305 except that it includes two parallel ridges 631a,b on each of four sides of the shaft 633. As shown, each pair of ridges 631a,b can be positioned approximately 90 degrees away from the neighboring pair). The holes 601 can extend in the shaft 633 between the individual ridges 631a,b of each pair of parallel ridges 631a,b. Further, in some embodiments (and as shown in FIGS. 6A-6B), the holes 601 can be through-holes so as to extend all the way from one side of the shaft 633 to another through the vacuum channel 607. Neighboring holes 601, however, can be offset along the longitudinal axis (as shown in FIG. 6B) so as to maintain integrity of the device 605.

Figure 7:
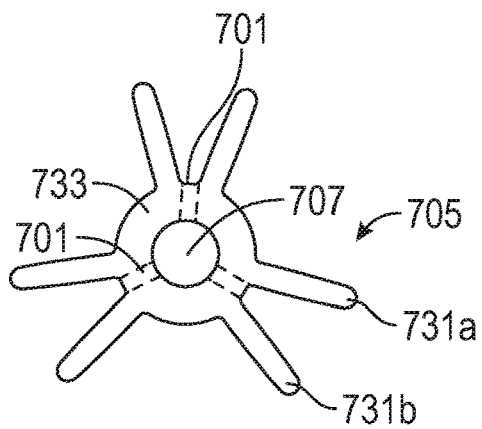
FIG. 7 is a cross-section of another device for controlling uterine hemorrhaging.

FIG. 7 shows another exemplary insertable device 705 that is similar to device 605 except that it includes only three pairs of ridges 731a, 731b (each pair being positioned approximately 120 degrees away from a neighboring pair). The holes 701 can similarly be positioned in the shaft 733 between the individual ridges 731a,b of each pair of ridges 731a,b.

Figure 8:
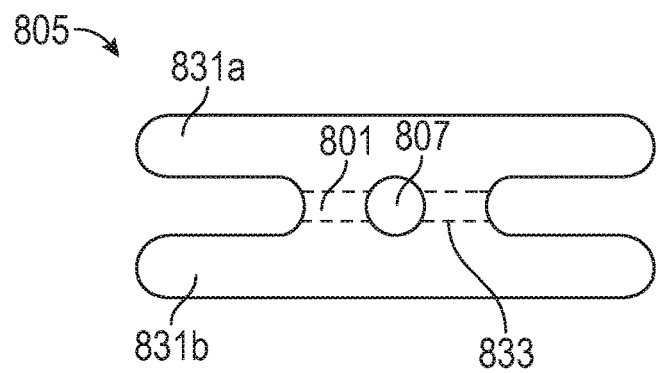
FIG. 8 a cross-section of another device for controlling uterine hemorrhaging.

FIG. 8 shows another exemplary insertable device 805 that is similar to device 605 except that it includes only two pairs of ridges 831a,b (e.g., positions approximately 180 degrees from one another). Holes 801 in the shaft 833 between the individual ridges 831a,b of the pairs of ridges 831a,b can be through-holes extending from one side of the device to the other through the central vacuum channel 807. The insertable device 805, due to having only two sets of ridges that are approximately 180 degrees apart from one another, can be substantially flat. This design may provide enhanced flexibility or bending in one direction (i.e., along the short axis) relative to another direction (i.e., along the longer axis).

Figure 9:
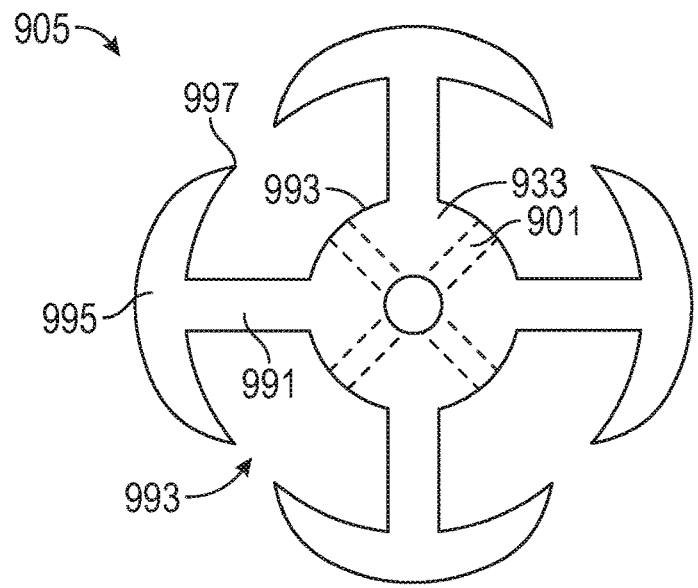
FIG. 9 is a cross-section of another device for controlling uterine hemorrhaging.

FIG. 9 shows another exemplary insertable device 905 that is substantially linear and includes a shaft 933 with a plurality of holes 901 extending in the sidewall of the shaft 933 from a central vacuum channel 907 to the exterior thereof (i.e., for application of vacuum therethrough). Protrusions 991 extend radially from the shaft 933 along the length of the shaft 933. The device 905 includes four protrusions that are positioned substantially 90 degrees away from one another. Further, the outermost tips of the protrusions 991 can each include circumferential extensions 995 having a crescent-shaped cross-section. The extensions 995 extend circumferentially around the device 905 (i.e., so as to form a substantially atraumatic circular outer profile of device 905). The open space 993 between extensions 995 and between the protrusions 991 and extensions 995 can advantageously can allow vacuum to reach holes 901 while the large circumferential coverage of the extensions 995 can prevent the tissue from collapsing onto the holes 901. In some embodiments, the extensions 995 can include sharp inner edges 997 such that twisting of the device 905 in the clockwise or counterclockwise direction can help cut through clots.

Figure 10:
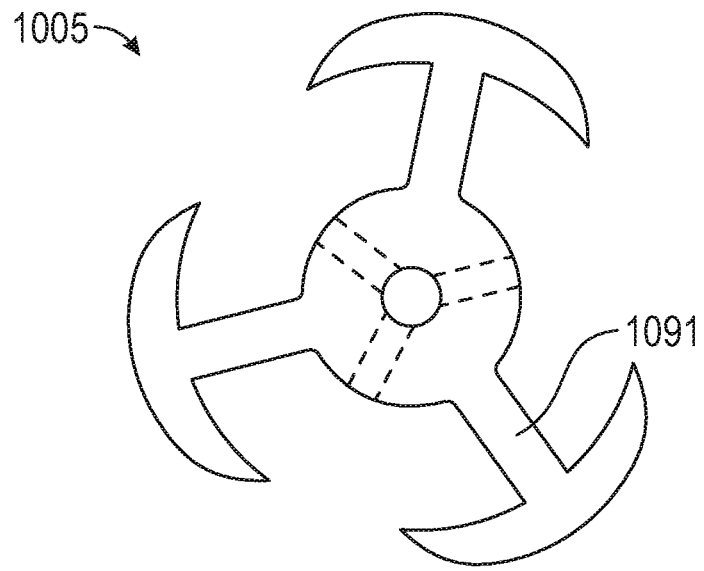
FIG. 10 a cross-section of another device for controlling uterine hemorrhaging.

FIG. 10 shows another exemplary insertable device 1005 that is similar to device 905 except that it includes only three protrusions 1091 (e.g., positioned substantially 120 degrees away from one another).

Figure 12A:
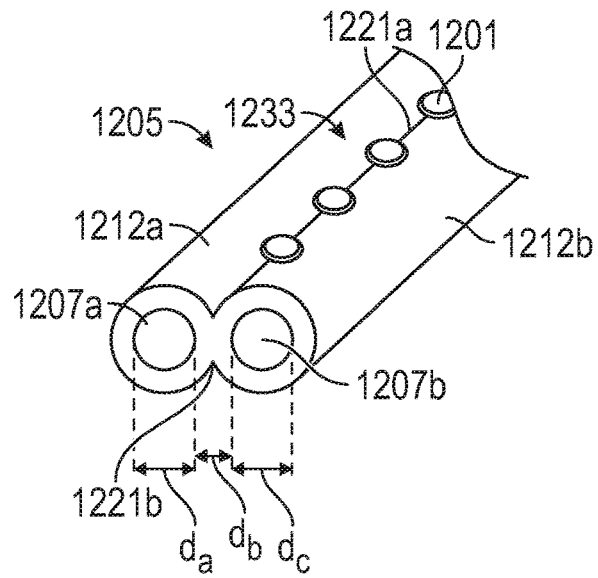
FIG. 12A is a perspective view of another exemplary insertable device for controlling uterine hemorrhaging.
Figure 12B:
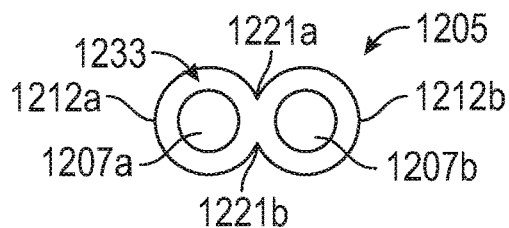
FIG. 12B is a cross-sectional view of the insertable device of FIG. 12A.

Another exemplary insertable device 1205 is shown in FIGS. 12A-12B. The device 1205 includes a shaft 1233 that is substantially linear and includes two tubular sections 1212a, 1212b extending side-by-side in parallel. Each tubular section 1212a,b includes a vacuum channel 1207a,b extending therein. The junction between the two tubular sections 1212a,b creates longitudinal crevices 1221a,b therebetween in which the holes 1201 can be positioned (i.e., with connection to the two vacuum channels 1207a,b). Positioning the holes 1201 within the longitudinal crevices 1221a,b can advantageously help ensure that tissue is not pulled into the holes 1201. In some embodiments, a diameter $d_v$ of each of the vacuum channels 1207a,b can be 3-6 mm, such as 5 mm, a distance $d_b$ between vacuum channels 1207a,b can be 1-3 mm, such as 1.5 mm, and the diameter of the holes 1201 can be 2-5 mm, such as 3 mm.

Figure 13A:
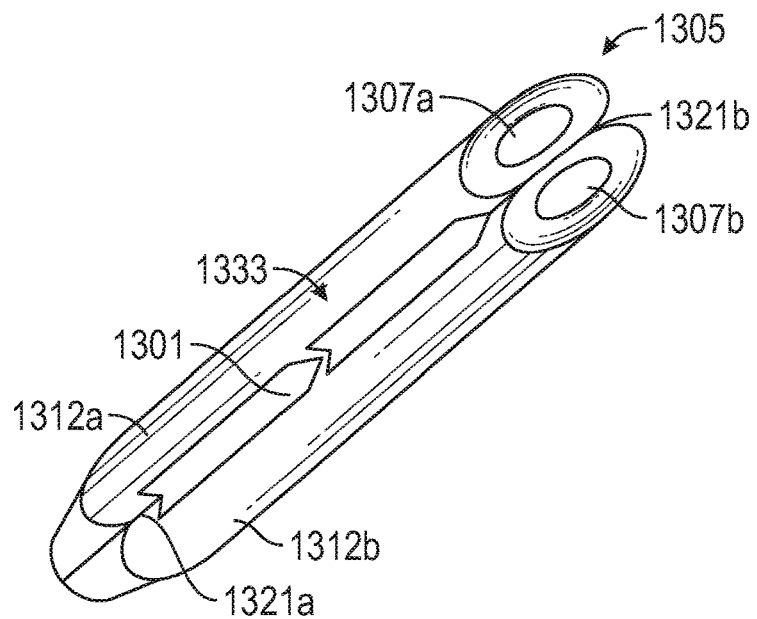
FIG. 13A is a perspective view of another exemplary insertable device for controlling uterine hemorrhaging.
Figure 13B:
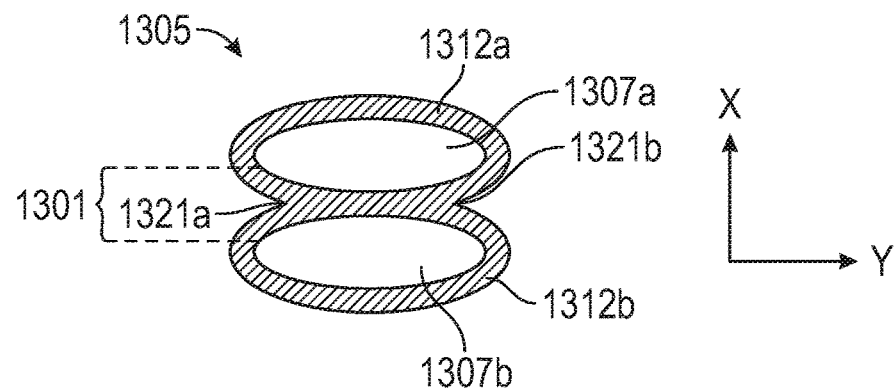
FIG. 13B is a cross-sectional view of the insertable device of FIG. 13A.
Figure 13C:
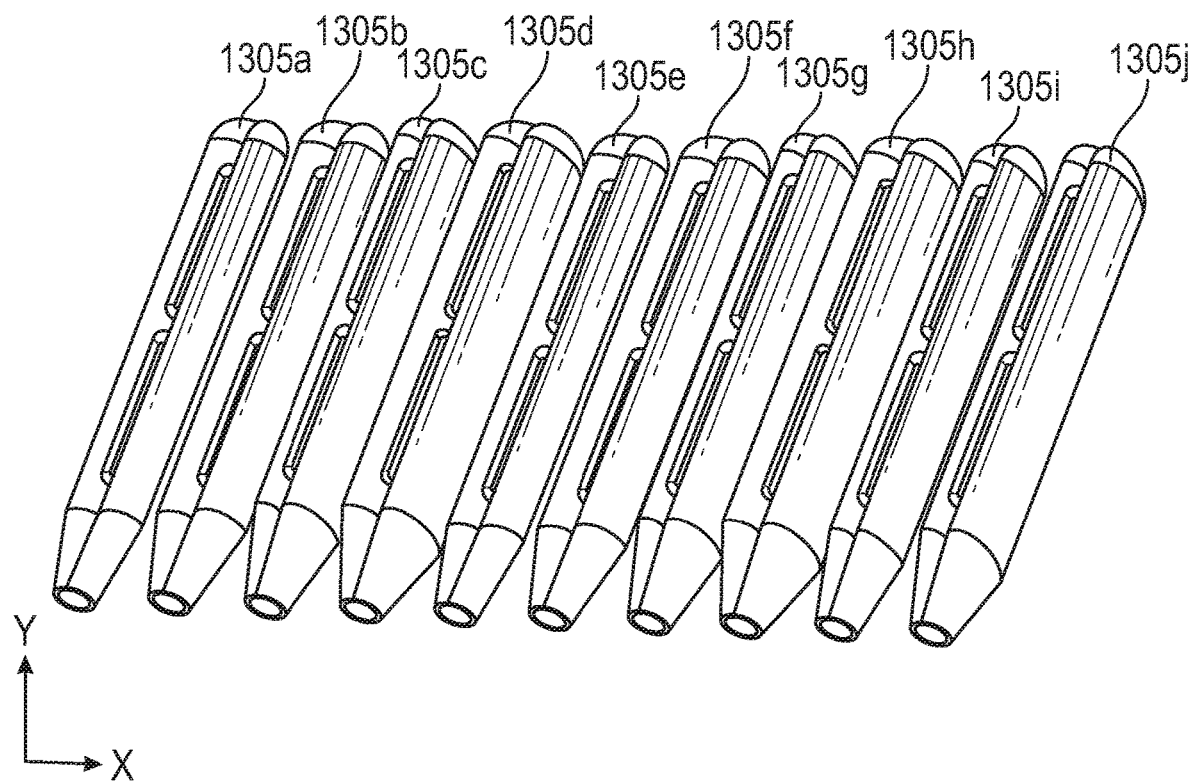
FIG. 13C is a perspective view of a plurality of different insertable devices for controlling uterine hemorrhaging.

Another exemplary insertable device 1305 is shown in FIGS. 13A-13C. The device 1305 is similar to device 1205 except that the tubular sections 1312a,b of the shaft 1333 are partially flattened so as to create oval-shaped vacuum channels 1307a,b and deeper crevices 1321a,b, and the holes 1301 have an elongate cross-section (though it should be understood that the holes 1301 can similarly have a circular cross-section). In some embodiments (and as shown in FIG. 13A), the holes 1301 can be through-holes that can extend from one side to the other. The orientation of the oval shape can advantageously provide preferential bending. For example, referring to FIG. 13B, the device 1305 can be inserted into the uterus with the plane defined by the Y-direction (i.e., the coronal plane) parallel to the birthing table with the woman on her back. The preferential flexing/bending would then be in the x-direction (perpendicular to the coronal plane), which is consistent with the anatomical curve of the uterus.

Figure 36:
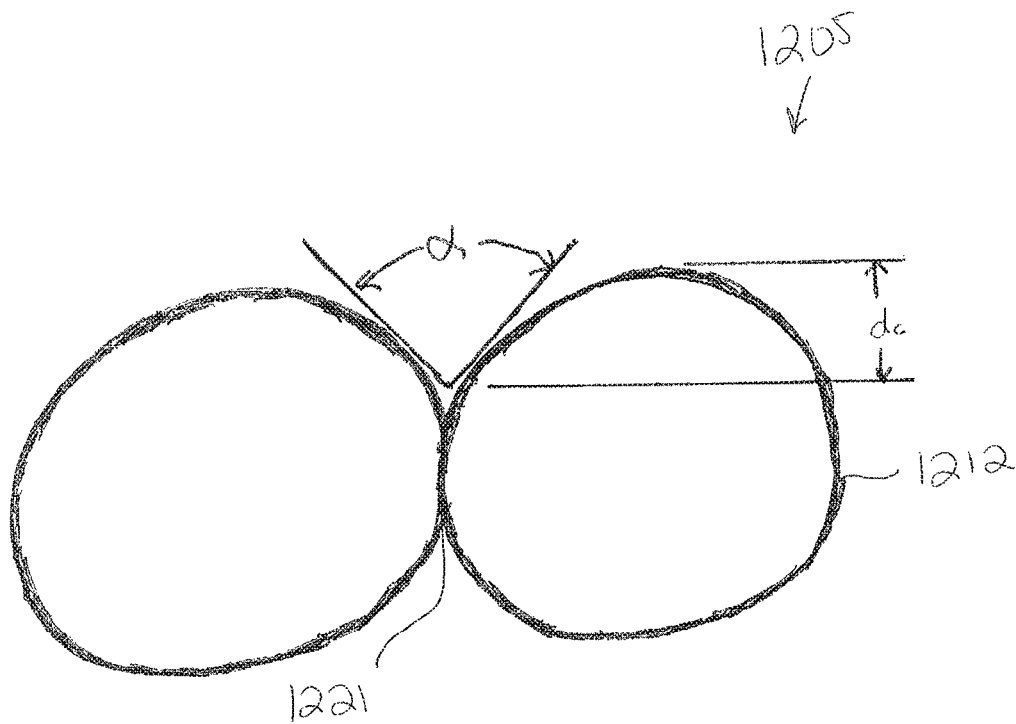
FIG. 36 shows the depth and angle of the crevice of the device of FIGS. 12A-12B.
Figure 37:
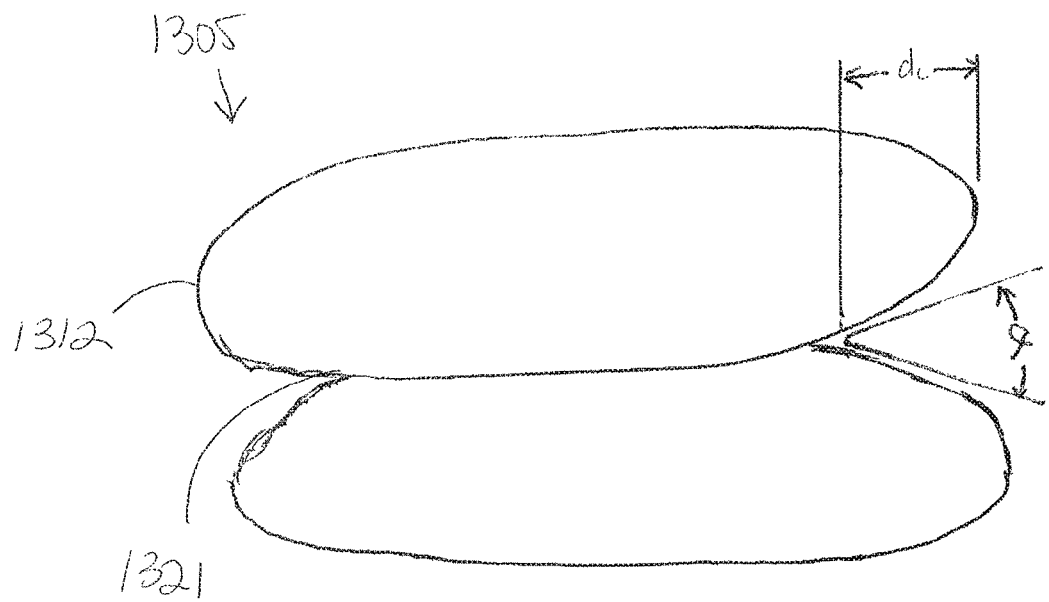
FIG. 37 shows the depth and angle of the crevice of the device of FIGS. 13A-13B.

Referring to FIGS. 36-37, the crevice 1221, 1321 formed between the two tubular members 1212, 1312 of devices 1205, 1305 (or similar devices) can be defined by a depth $(d_c)$ and an angle $(\alpha)$. The angle $\alpha$ is formed by straight lines meeting at an apex at or near the base of the crevice 1221, 1321. The depth $d_c$ is determined from the apex of the angle to the top surface of the tubular members 1212, 1312. The larger the angle $\alpha$, the easier the crevice 1221, 1321 can be cleaned if one were to reuse the device 1205, 1305. However, the larger angle $\alpha$ also can lead to the over-lying tissue sagging down and occluding the holes at the base of the crevice 1221, 1321. The smaller angle $\alpha$ can make it more difficult for over-lying tissue to sag down and occlude the holes, but the tighter crevice 1221, 1321 at the base can be more easily occluded with clotted blood. Additionally, the narrower crevice 1221, 1321 can make the device 1205, 1305 harder to clean in the case of reuse. Accordingly, the depth $d_c$ of the crevices 1221, 1321 can be between 0.02" and 0.20", such as between 0.05" to 0.12". Further, the crevices 1221, 1321 can have an angle $\alpha$ of 10-80 degrees, such as 20-65 degrees. These depths $d_c$ and angles $\alpha$ can advantageously prevent occlusion from both blood and sagging tissue while ensuring that the device 1205, 1305 can be cleaned properly.

FIG. 13C shows variations of the device 1305 (1305a-1305j). Variations 1305a, 1305b, 1305e, and 1305f are flatter than the rest of the variations (i.e., the thickness in the y-direction is less than the thickness in the x-direction) such that the holes 1301 extend through the thinner section. In contrast, variations 1305c, 1305d, 1305g, and 1305h have the holes 1301 extending through the thicker section (as the thickness in the y-direction is greater than the thickness in the x-direction). Having holes 1301 extending through the thicker section (as in variations 1305c, 1305d, 1305g, and 1305h) may more readily align with the two planes of the faces of the uterus coming together, facilitating the evacuation of fluid from those two planes. In some embodiments, a ratio of width in the x direction to height in the y direction (or vice versa) of the devices of FIGS. 13A-13C can be between 1.4 and 2.3 so as to provide for preferential flexing.

Figure 14:
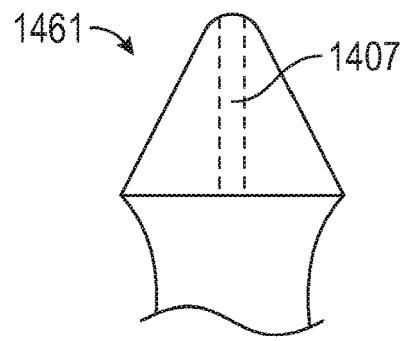
FIG. 14 shows an exemplary distal tip for an insertable device for controlling uterine hemorrhaging.
Figure 15A:
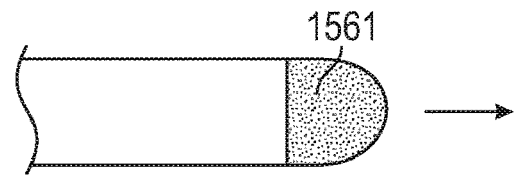
FIG. 15A shows another exemplary distal tip for an insertable device for controlling uterine hemorrhaging.
Figure 15B:
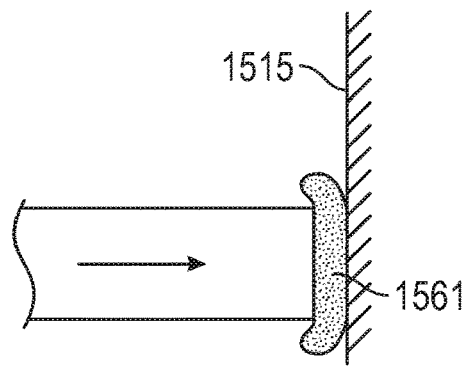
FIG. 15B shows compression of the distal tip of FIG. 15A against tissue.

Any of the insertable devices of FIGS. 3-13 can have a tapered and/or atraumatic distal tip to ensure that the uterine wall is not damaged during insertion and use. For example, FIG. 14 shows an exemplary distal tip 1461. The distal tip 1461 can be of the same or softer diameter than the rest of the insertable device (e.g., the shaft of the insertable devices). Similarly, an exemplary tip 661 is shown in FIG. 6B. The tip 661 can have a conical shape into which the ridges 631 abut and/or end so that none of the distal ends of the ridges 631 directly contacts tissue. As shown in FIGS. 14 and 6B, in some embodiments, the central vacuum channel 1407, 607 can extend along the entire device (including the tip 1461, 661), e.g., to provide an additional vacuum port at the distal end and/or so as to allow for flushing or cleaning of the device. Referring to FIGS. 15A-15B, in some embodiments, the tip 1561 can be a soft dome that can collapse during engagement with tissue 1515 (see collapse from FIG. 15A to 15B) to prevent perforation of the uterus. In some embodiments, the dome tip 1561 can be hollow. In other embodiments, the dome tip 1561 can include a soft sponge-like material or molded webbing therein to afford an optimized flexibility or softness for engagement with tissue.

Figure 16:
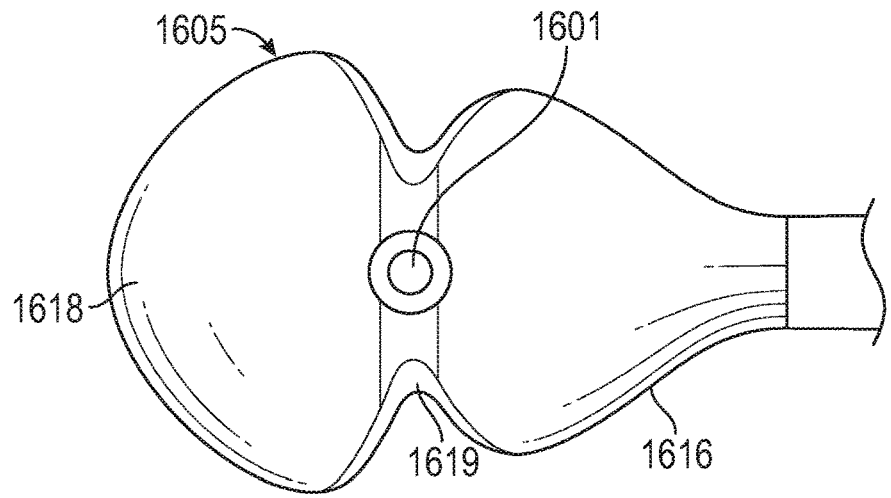
FIG. 16 is a side view of another exemplary insertable device for controlling uterine hemorrhaging.

FIG. 16 shows another exemplary insertable device 1605. The device 1605 includes a proximal bulbous structure 1616 and a distal bulbous structure 1618. The holes 1601 (for connection to the vacuum channels) are positioned in the crevice 1619 formed between the proximal and distal bulbous structures 1616, 1618. The bulbous structures 1616, 1618 can be made of a soft material (e.g., foam or webbing) to provide enough collapse for insertion through cervix, but enough stiffness to prevent tissue from occluding the holes 1601 upon the application of vacuum.

Various seal designs are possible for use with an anti-hemorrhaging devices and systems as described herein (e.g., systems 100 or 200 and/or with any of the devices shown in FIGS. 2A-13C). For example, the seal 222 can be used with any of the devices described herein. In one embodiment, the seal 222 can be positioned along the shaft 1333 of device 1305. Similarly, FIGS. 17-30 show a number of different exemplary seal designs that can be used with any of the devices described herein.

Figure 17A:
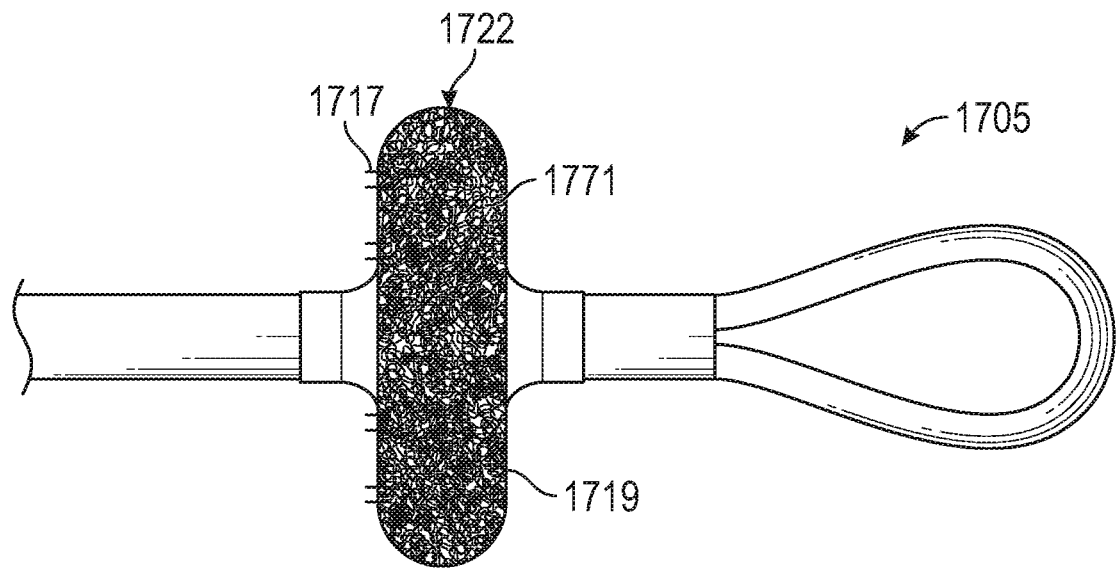
FIG. 17A shows a foam seal on an exemplary insertable device for controlling uterine hemorrhaging.
Figure 17B:
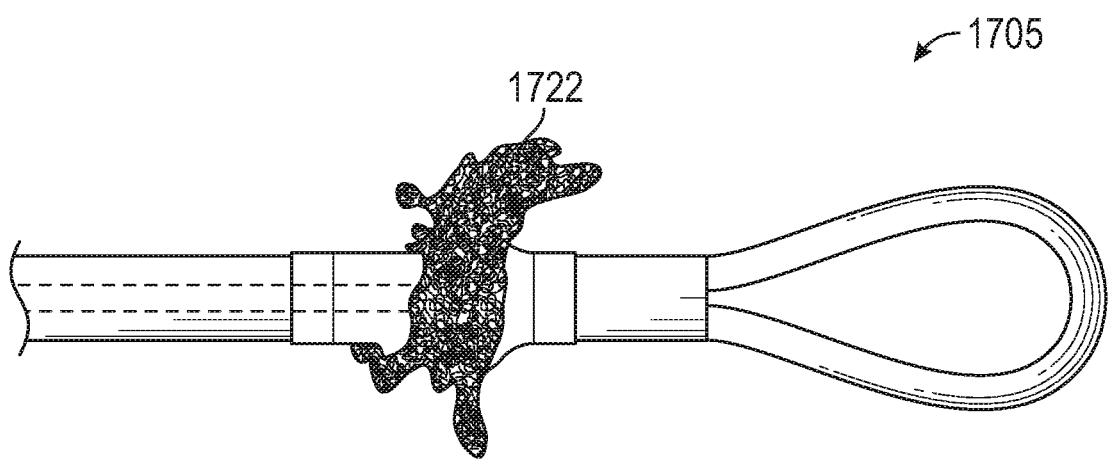
FIG. 17B shows the foam seal of FIG. 17A in a compressed configuration.

FIGS. 17A-17B show an insertable device 1705 with a seal 1722. The seal 1722 can be made of a thin, compliant sheath 1719 with a foam material 1771 therein. Vent holes or slits 1717 can extend through the proximal end of the sheath 1719 to allow air to enter to the foam material 1771 to expand the seal 1722. As shown in FIG. 17B, the seal 1722 can be collapsed (e.g., by compressing the palm or fingers prior to insertion with the body) and then expanded once inside the body such that the seal 1722 conforms to the anatomy. In some embodiments, the seal 1722 can be connected to an inflation lumen (e.g., running in parallel to the vacuum lumen as described above) to aid in inflation of the seal 1722. In other embodiments, exposure of the slits 1717 at the proximal end of the seal 1722 can provide enough air access such that an inflation lumen is not necessary.

Figure 18:
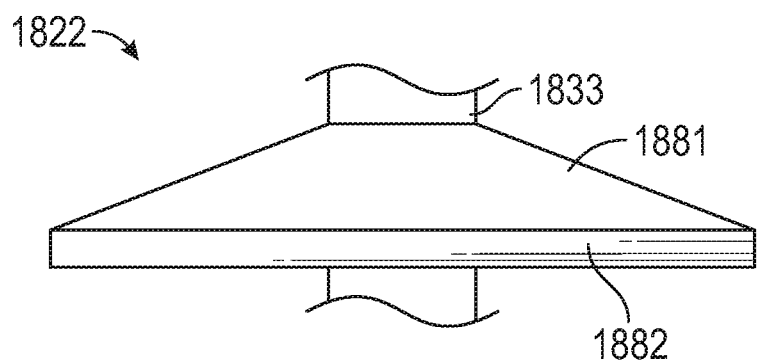
FIG. 18 is a side view of another exemplary seal for use with an insertable device for controlling uterine hemorrhaging.

FIG. 18 is a side view of an umbrella-shaped (or conical) diaphragm seal 1822 with the shaft 1833 of the insertable device running up the middle. The distal curved end (or skirt) 1881 of the diaphragm 1822 is intended to face the uterus (i.e., with the narrow end closest to the uterus) while the proximal ring 1882 can maintain the circular shape of the proximal end. The distal skirt 1881 can either seal against the cervical opening or the outer ring 1882 can seal against the tissue of the vaginal canal or cervical canal to allow vacuum to be created within the uterus. In some embodiments, the outer ring 1882 can press against and/or make continuous radial contact with tissue of the vaginal canal or cervical wall so as to hold the seal within the uterus.

FIGS. 30A-30D show an insertable device 3005 that is similar to insertable device 1822, including an umbrella-shaped (or conical) diaphragm seal 3022 with the shaft 3033 of the insertable device 3055 running up the middle of the seal 3022. In contrast to seal 1822, the distal skirt 3081 of the seal 3022 has a smaller angle $\alpha$ (see FIG. 30A) relative to the shaft 3033 (e.g., the angle $\alpha$ can be 30 degrees-60 degrees, such as approximately 45 degrees). The proximal ring 3082 can be a heavy or stiff ring (e.g., can be a solid polymer ring with a diameter of 2-10 mm, such as approximately 5 mm). The stiff ring 3082 can advantageously maintain the round or oval shape in spite of tissue collapsing around the ring 3082. The distal skirt 3081 can further be thicker than the skirt of seal 1822 (e.g., the wall of the skirt 3081 can have a thickness of 1-1.5 mm, such as approximately 1.2 mm).

Figure 30A:
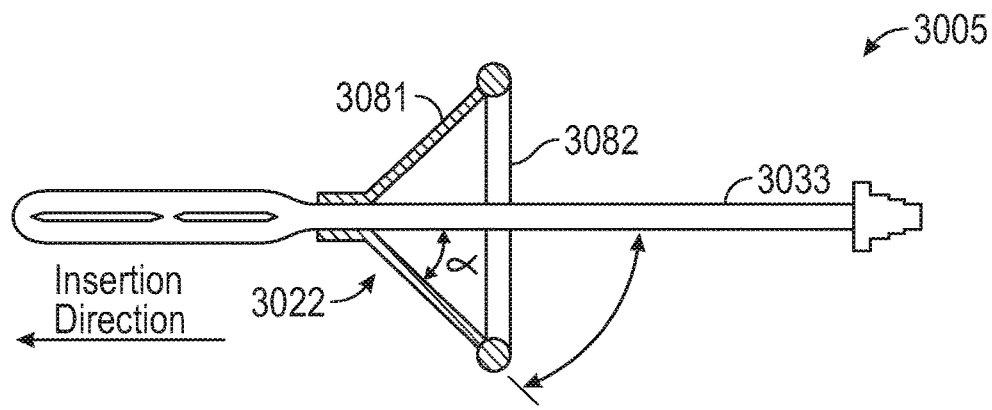
FIG. 30A is a cross-sectional view of another exemplary insertable device for controlling uterine hemorrhaging.
Figure 30B:
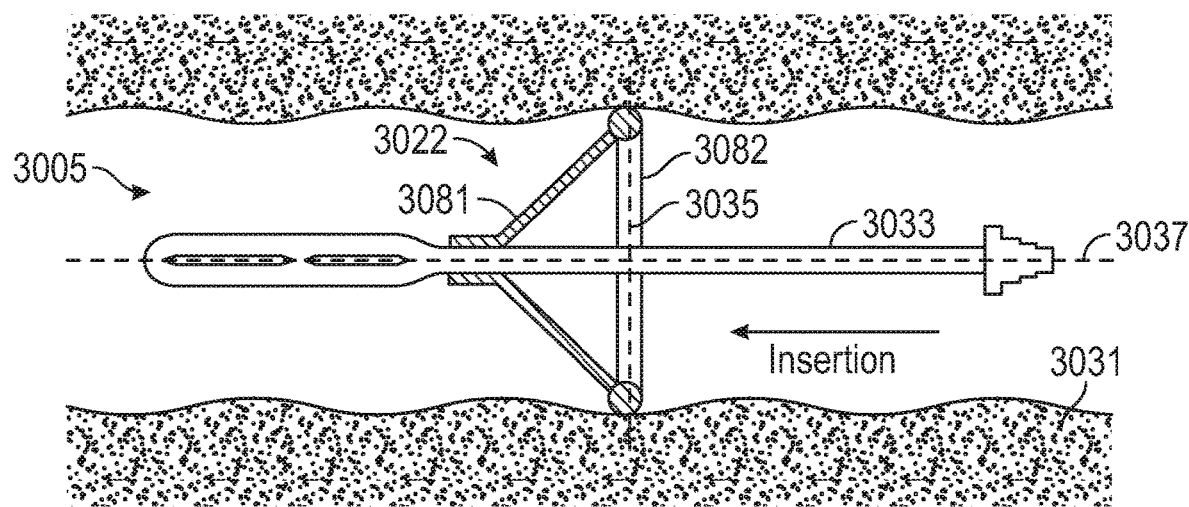
FIG. 30B shows insertion of the insertable device of FIG. 30A.

Referring to FIG. 30B, when inserted into the vaginal or cervical canal, the ring 3082 can sit against the tissue 3031 of the vaginal or cervical wall to seal the device thereon. The stiffness of the ring 3082 can advantageously help maintain the shape of the ring 3082 in-plane (i.e., within a plane 3035 that is perpendicular to a longitudinal axis of 3037 of the shaft 3033). The thick skirt 3081, in tension upon placement, can further help the ring 3082 stay in position (in plane 3035 perpendicular to the longitudinal axis 3037), preventing the ring 3082 from pivoting, laying flat, and/or losing seal. Anatomically, this design and orientation of seal 3022 can advantageously provide an optimal orientation to affect a seal with tissue 3031 of the vaginal or cervical wall.

Figure 30C:
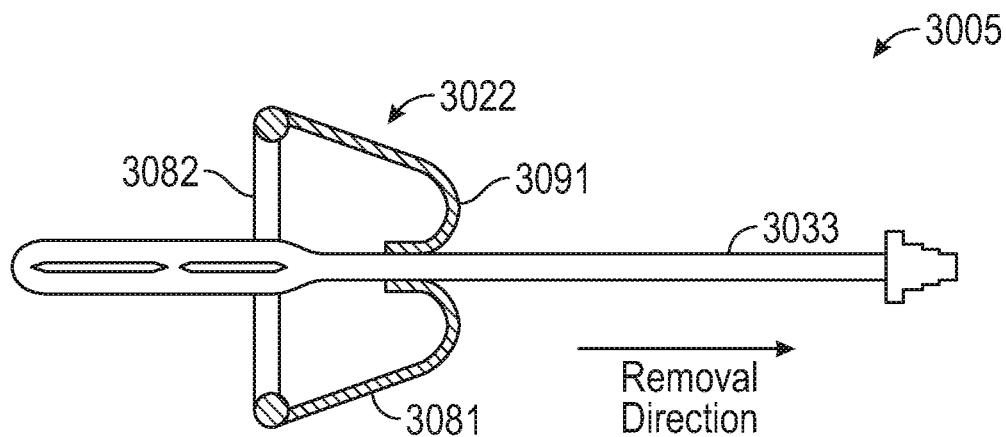
FIG. 30C shows insertable device of FIG. 30A inverted.

Referring to FIG. 30C, the skirt 3081 of the insertable device 3005 can be configured to invert as the shaft 3033 is pulled proximally. That is, the flexible skirt 3081, when a force is applied proximally, can begin to roll back on itself, typically starting with the portion of the skirt closest to the shaft 3033. The propensity (force required) to invert can be determined, for example, by the thickness of the skirt 3081 especially right next to the shaft 3033. Additionally, the propensity to invert can be determined by the angle $\alpha$ between the skirt 3081 and the shaft 3033. The greater the angle $\alpha$, the easier it is to invert. The lower the angle $\alpha$, in contrast, the higher resistance the skirt 3081 provides to laying flat or pivoting the plane of the ring 3082.

Figure 30D:
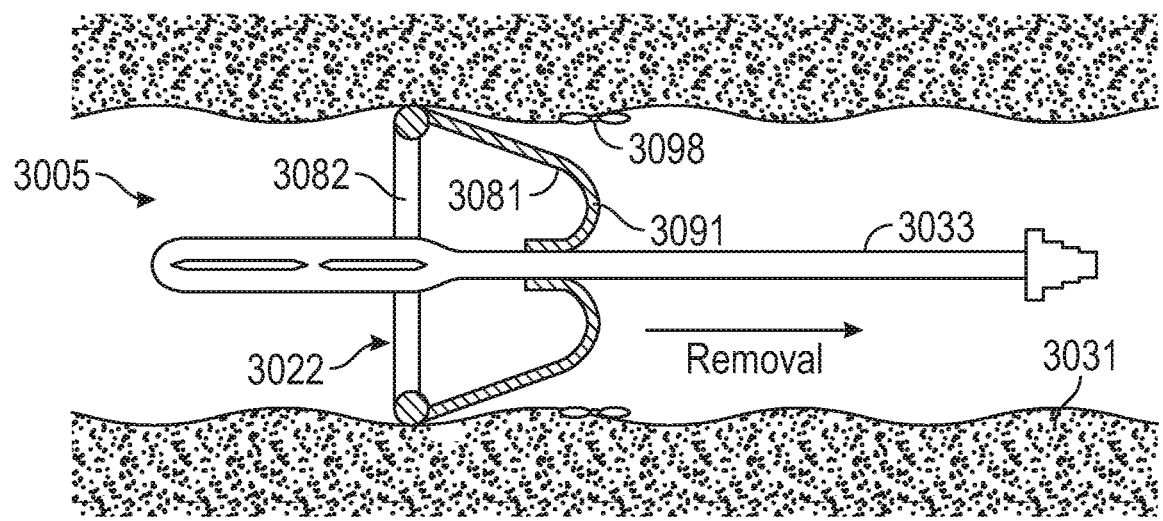
FIG. 30D shows inversion of the insertable device of FIG. 30A as the shaft is pulled proximally.

As shown in FIG. 30D, inversion of the skirt 3081 can form a conical leading edge 3091 that parts the tissue 3031 of the vaginal or cervical wall as the edge 3091 is pulled proximally. Additionally, the attachment of the ring 3082 to skirt 3081 can be designed to provide the smoothest outer surface in the removal direction to avoid damage to repair sutures 3098 that may have been placed in the vaginal or cervical canal. For example, the skirt 3081 attachment to the stiff ring 3082 can be on the outermost diameter of the device 3005 when the skirt 3081 is inverted so that as the device 3005 is withdrawn proximally, the skirt 3081 (with the most shallow angle to the tissue 3031 of the vaginal or cervical wall) will easily ride over the tissue, particularly any repair sutures 3098 that may be in place on the vaginal or cervical walls. As the skirt gets longer (with a smaller angle $\alpha$ and the same diameter stiff ring 3082) that ramp against the tissue wall will become more shallow, making it easier to ride over sutures 3098.

It should be understood that while maintaining a perpendicular relationship between the plane of the ring 3082 and the longitudinal axis of the shaft 3033 can be advantageous, some variation in that perpendicular relationship may also be helpful to allow latitude for differing anatomy.

Figure 31:
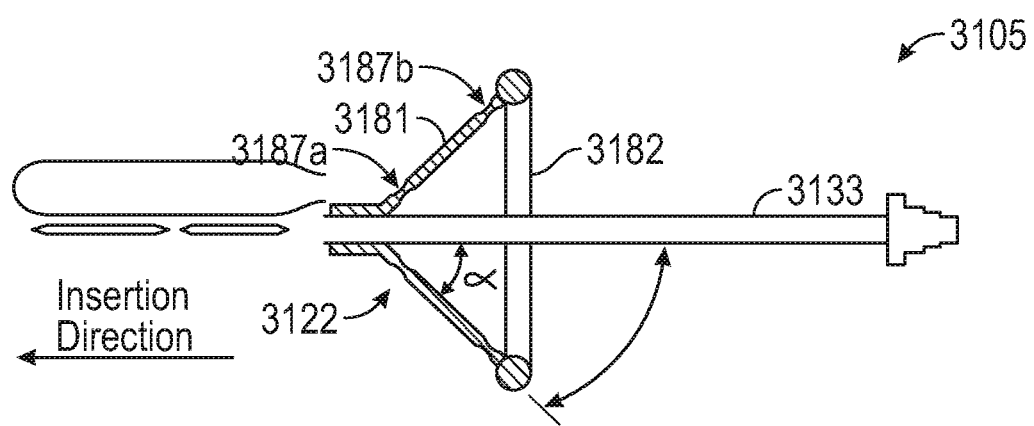
FIG. 31 is a cross-sectional view of another exemplary insertable device for controlling uterine hemorrhaging.

In some embodiments, the thickness of the skirt 3081 can vary from the proximal to the distal end to optimize the flex pattern of the skirt 3081. For example, the thickness can be tailored at specific distances between the attachment to the shaft and the stiff ring. FIG. 31 shows an exemplary insertable device 3105 in which there are thinned portions 3187a,b along the length of the skirt 3181. The variation in thickness can be advantageous for placement and operation/sealing of the device and to enhance the inversion mechanics during device removal.

Figure 19:
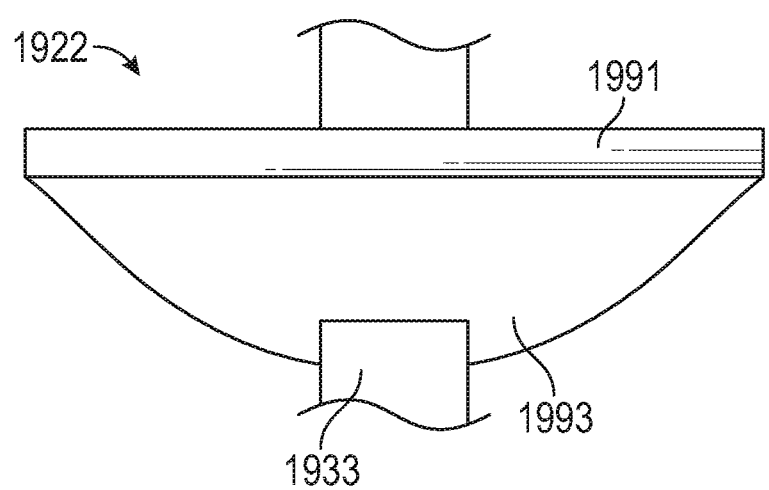
FIG. 19 is a side view of another exemplary seal for use with an insertable device for controlling uterine hemorrhaging.

FIG. 19 is a side view of a cupping cuff seal 1922 with the shaft 1933 of the insertable device running up the middle. The distal ring 1991 can face the uterus, surround the outside of the cervical opening, and reside in the vaginal fornix. The curved proximal end 1993 can cup the cervical opening and create a seal to hold vacuum in the uterus.

Figure 20:
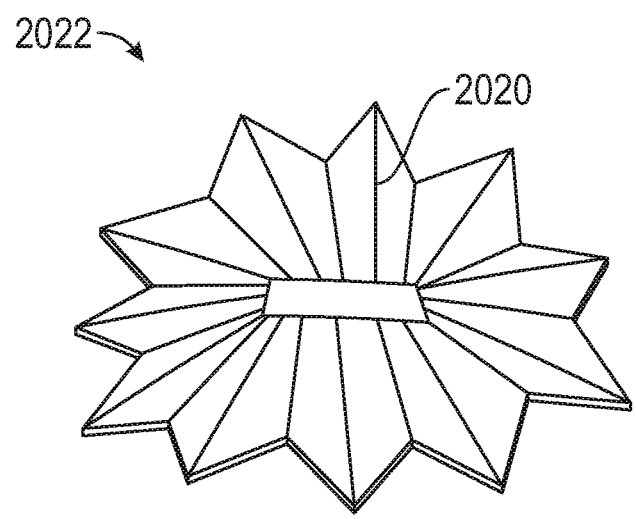
FIG. 20 is a top view of another exemplary seal for use with an insertable device for controlling uterine hemorrhaging.

FIG. 20 is a top view of a collapsible seal 2022 in a partially collapsed configuration. The seal 2022 is similar to the seal 1822 except that it includes radial folds 2020 that allow the umbrella shape to easily collapse for insertion (i.e., to fit into the smaller diameter vaginal or cervical canal) while allowing the umbrella shape to expand out to fill a larger space after insertion so as to create a seal to hold a vacuum within the uterus.

Figure 21:
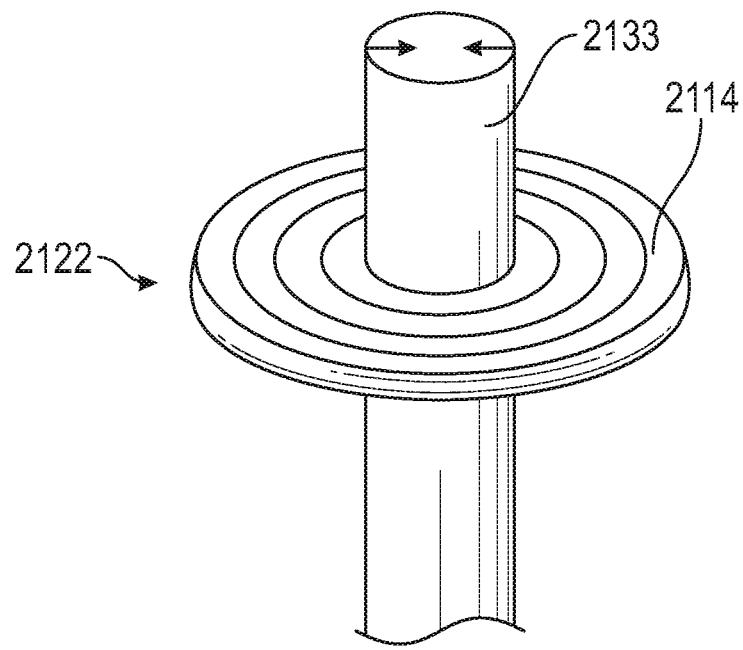
FIG. 21 is a side perspective view of another exemplary seal for use with an insertable device for controlling uterine hemorrhaging.

FIG. 21 is an isometric view of a seal 2122 around a shaft 2133 of the insertable device. The seal 2122 is a flat disk-shaped seal with multiple connected rings 2114 that allow the disk to telescope into a conical shape. In use, the outermost ring 2114 can capture vaginal or cervical tissue in a larger diameter space upon insertion but allow continued insertion of the shaft 2133 of the device, if necessary, into the uterus.

Figure 22:
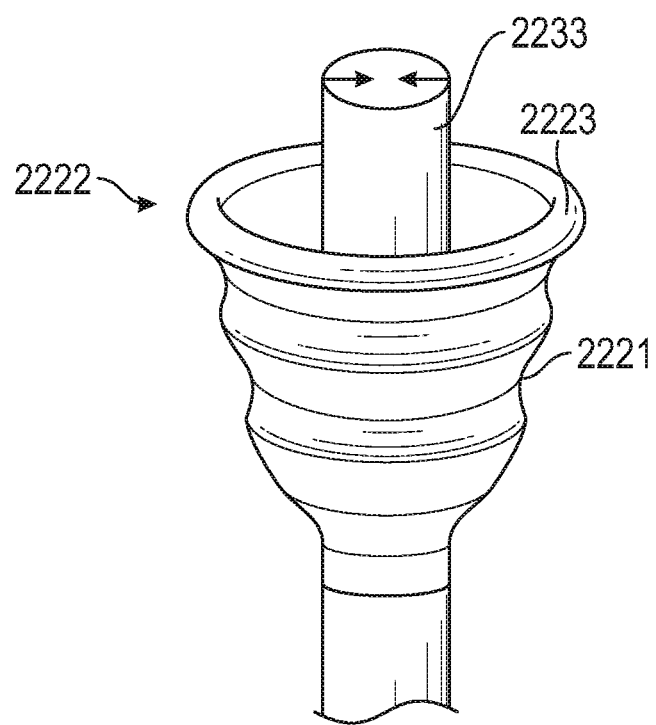
FIG. 22 is a side perspective view of another exemplary seal for use with an insertable device for controlling uterine hemorrhaging.

FIG. 22 is an isometric view of a collapsing cone seal 2222 with tiered ridges 2221 or edges extending around the circumference. The distal ring 2223 can be designed to be oriented towards the uterus. Upon insertion of the device, the collapsing cone design allows a seal to take place around the distal ring 2223, but still permits further (distal) insertion of the device, if necessary, without dislodging the seal 2222.

Figure 23A:
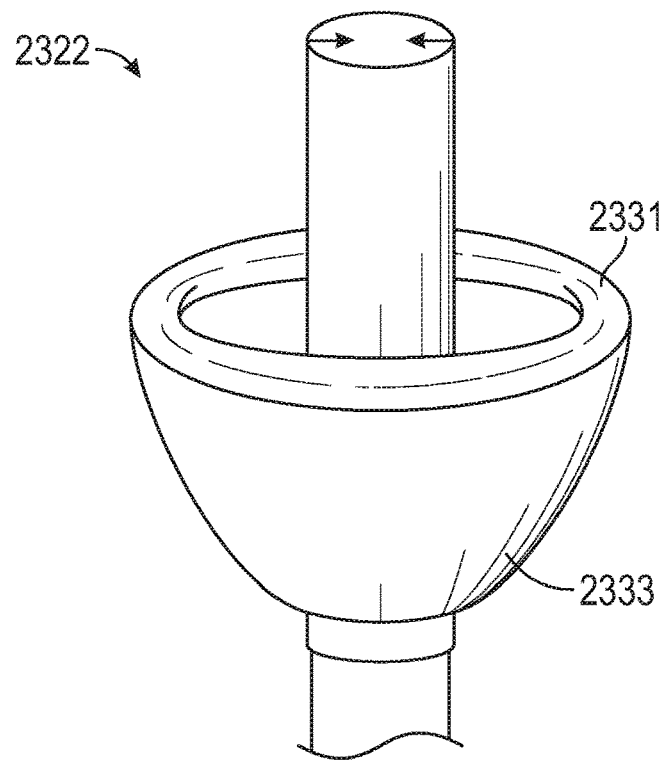
FIG. 23A a side perspective view of another exemplary seal for use with an insertable device for controlling uterine hemorrhaging.
Figure 23B:
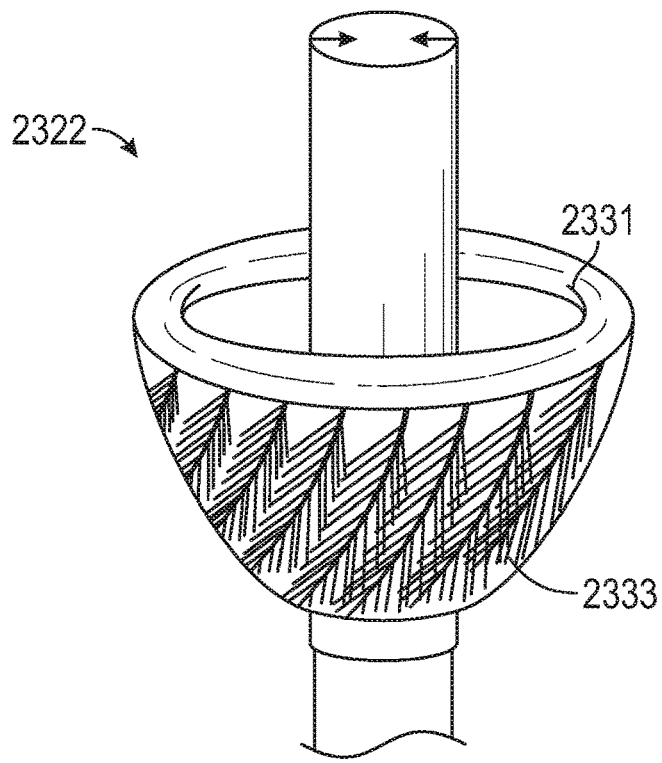
FIG. 23B is a side perspective view of the seal of FIG. 23A with spiral ridges or valleys.

FIGS. 23A-23B show an inverted cup seal 2322. The distal ring 2331 is intended to face the uterus and seal against the upper vaginal canal and around the cervical opening (e.g., with the ring 2331 resting in the vaginal fornix). The curved distal end 2333 can hold the vacuum within the uterus. As shown in FIG. 23B, the seal 2322 can include a plurality of spiraling ridges and/or valleys that can, for example, allow for easier and predictable methods of collapse of the seal 2322. These ridges and valleys can allow the physician to remove the device gently without tearing fresh vaginal sutures. Additionally, these ridges and valleys can assist in insertion of the device, as the seal 2322 can be twisted and grasped between two fingers, allowing more visibility during placement.

Figure 24:
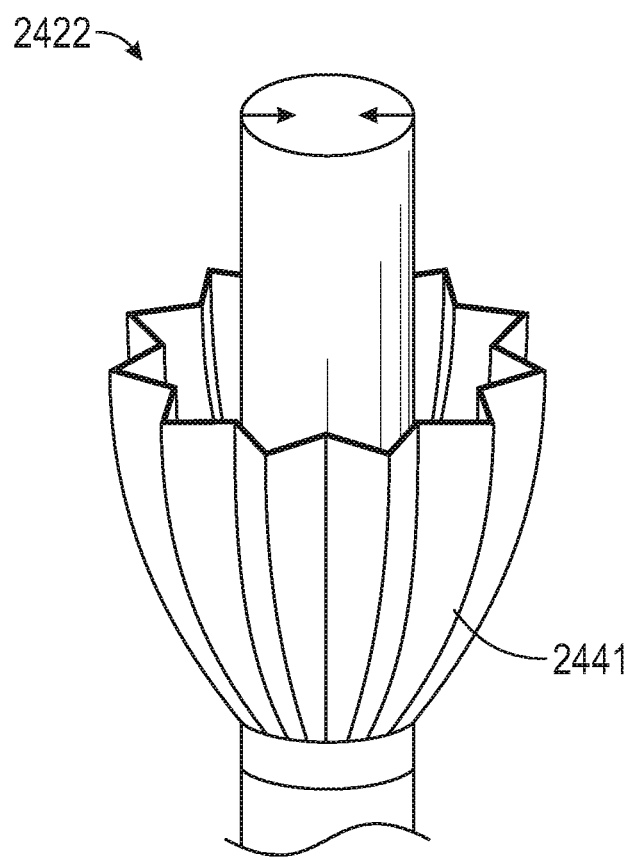
FIG. 24 is a side perspective view of another exemplary seal for use with an insertable device for controlling uterine hemorrhaging.

FIG. 24 shows an inverted cup seal 2422 that is similar to seal 2322, but includes axially extending pleats 2441 to facilitate the collapse of the seal 2422 for insertion. The material used for seal 2422 can be resilient such that removal of the collapsing force allows the material to naturally expand back out to the cup shape (e.g., after insertion).

Figure 25:
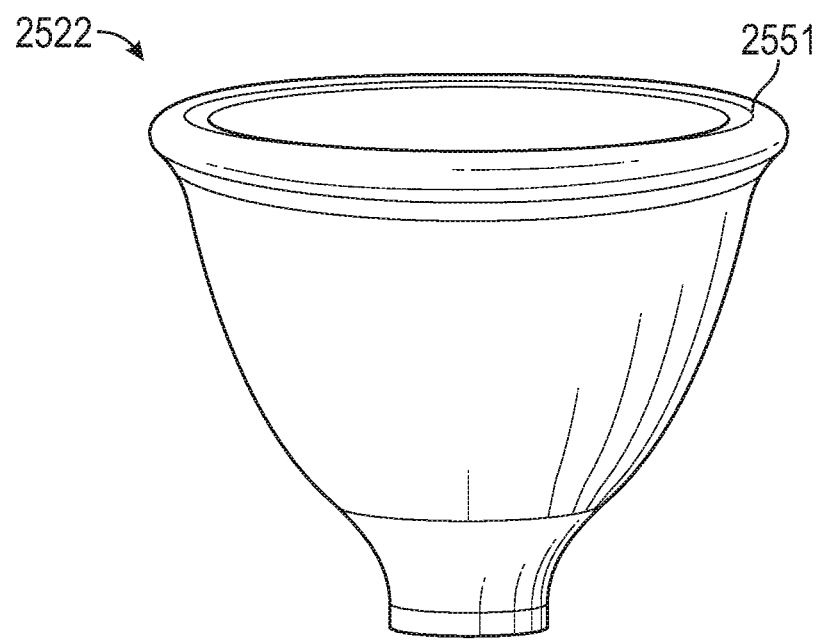
FIG. 25 is a side perspective view of another exemplary seal for use with an insertable device for controlling uterine hemorrhaging.

FIG. 25 shows a cup seal 2522 similar to seal 2322 except that the distal edge 2551 is slightly flared outwards.

Figure 26A:
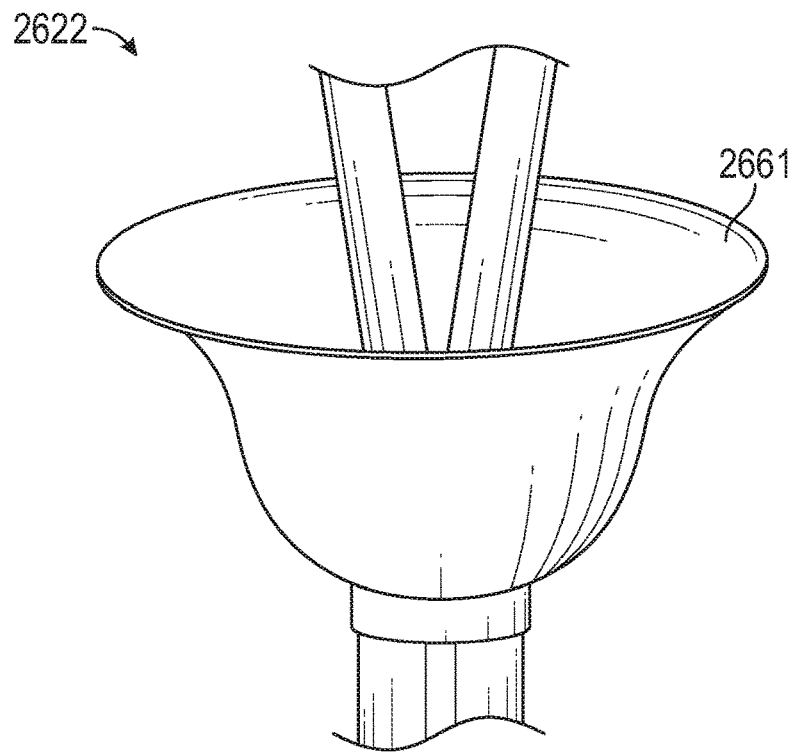
FIG. 26A is a side perspective view of another exemplary seal for use with an insertable device for controlling uterine hemorrhaging.
Figure 26B:
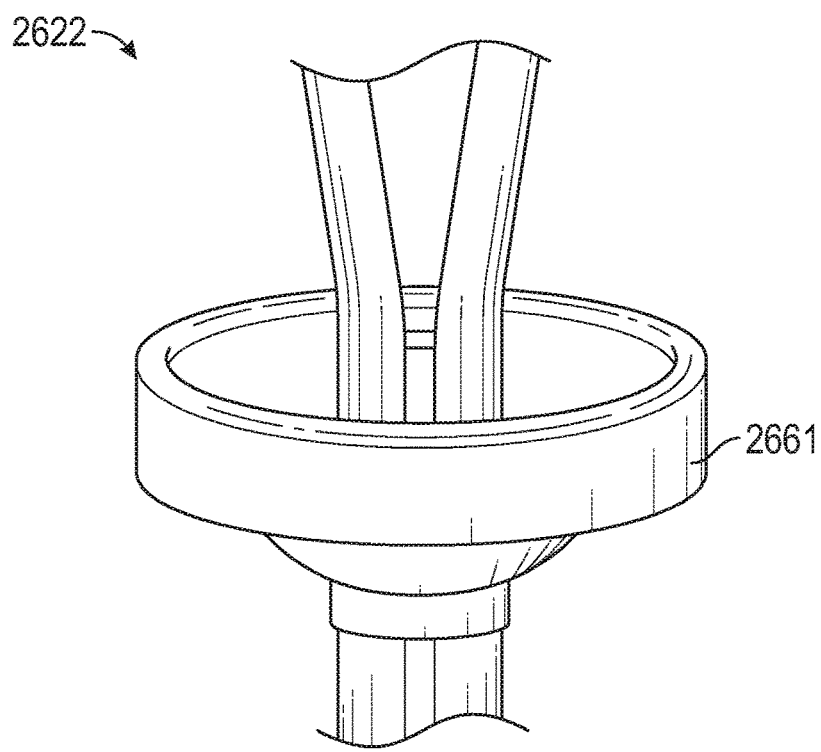
FIG. 26B is a side perspective view of the seal of FIG. 26A with the distal end rolled proximally.

FIGS. 26A-26B show a seal 2622 that is similar to seal 2622 except that it includes a compliant flared distal end 2661 that can roll back (i.e., proximally) onto itself (e.g., to accommodate a smaller diameter vaginal or cervical canal). FIG. 26A shows the end 2661 extended while FIG. 26B shows the end 2661 rolled proximally.

Figure 27:
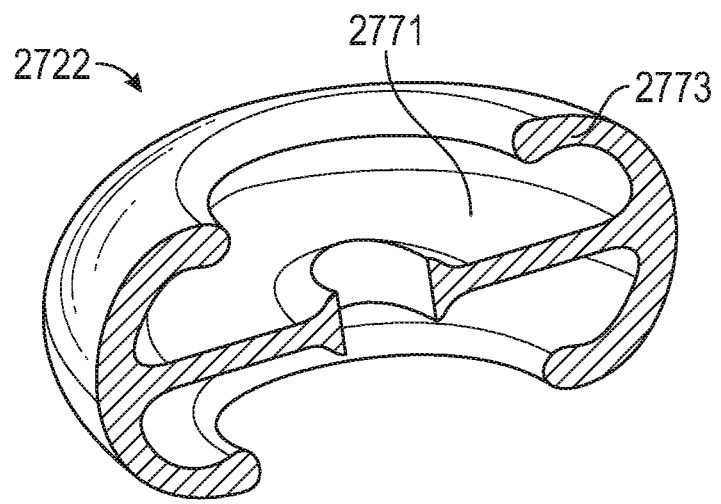
FIG. 27 is a side perspective cross-section of another exemplary seal for use with an insertable device for controlling uterine hemorrhaging.

FIG. 27 shows a seal 2722 that includes a central disk 2771 or diaphragm that supports a curved annular structure 2773. The annular structure 2773 can seal against the vaginal or cervical wall (e.g., at the cervical opening) to hold the vacuum within the uterus.

Figure 28:
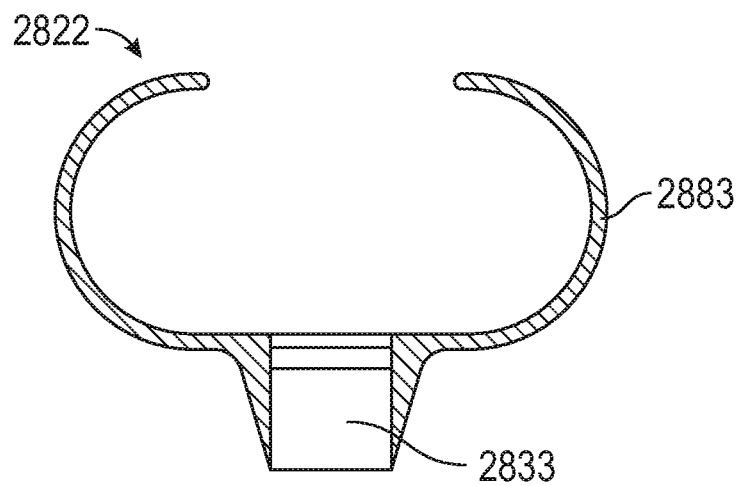
FIG. 28 is a cross-sectional view of another exemplary seal for use with an insertable device for controlling uterine hemorrhaging.

FIG. 28 shows a seal 2822 that includes a curved annular structure 2883 that is supported at the proximal end by attachment to the shaft 2833 and is open at the distal end.

Figure 29:
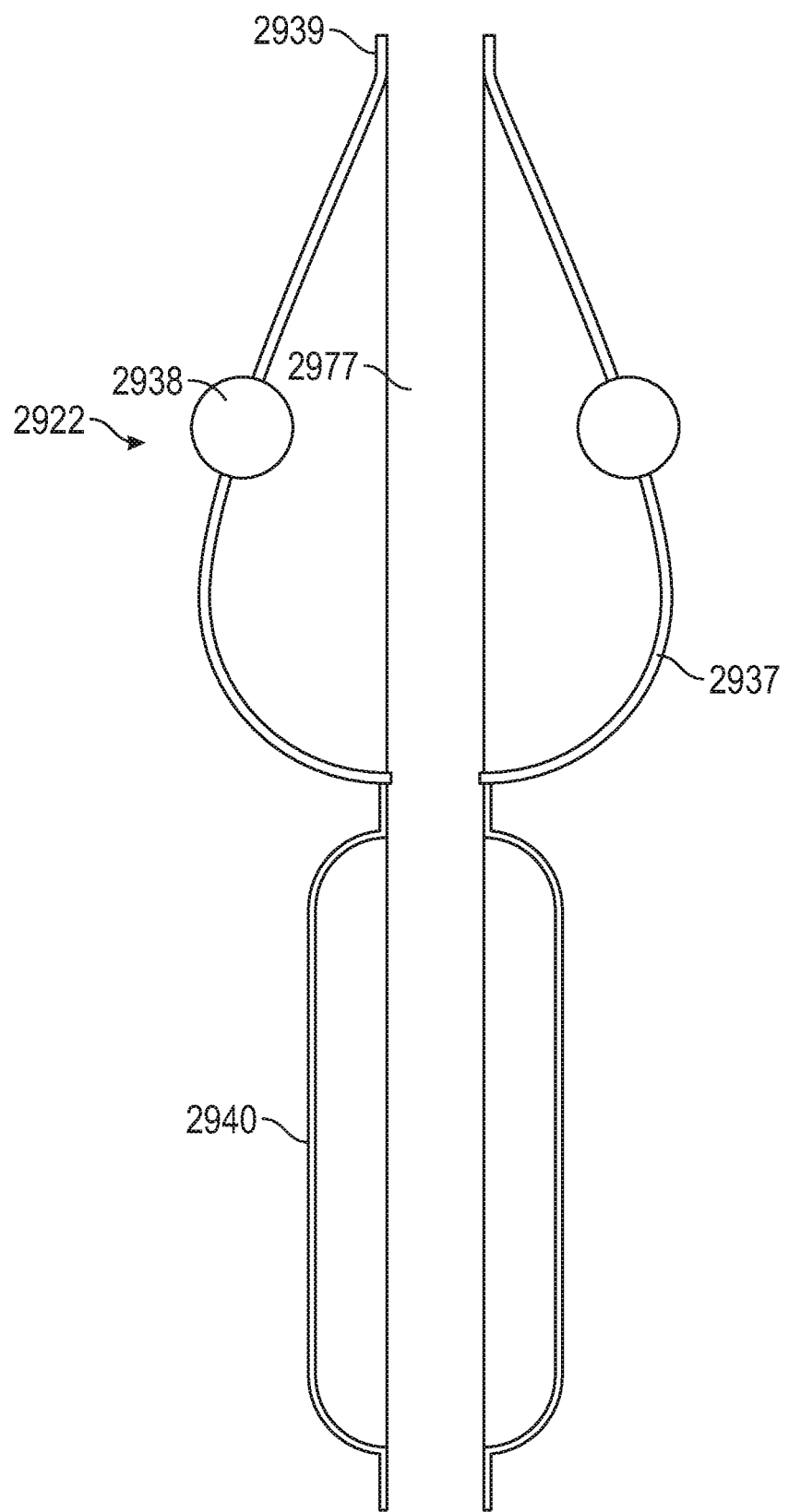
FIG. 29 is a cross-sectional view of another exemplary seal for use with an insertable device for controlling uterine hemorrhaging.

FIG. 29 shows another exemplary seal 2922. The seal 2922 includes an inflatable bulb 2937 that is sealed to the shaft 2977 of the insertable device. The bulb 2937 can be made of a material that allows it to anchor against the tissue at the opening of the postpartum cervix. In some embodiments, for example, the bulb 2937 can be made of a medium durometer silicone or other flexible material. The bulb 2937 can further include a taper 2939 at the distal end to ease insertion through the vaginal canal and into the cervix. The overall shape of the bulb 2937 can advantageously provide sealing when vacuum is pulled inside the uterus. In some embodiments, the bulb 2937 can include an annular stiffening ring 2938 therearound. The stiffening ring can have a greater strength relative to the rest of the bulb 2937 so as to help maintain the rounded or oval shape as the bulb 2937 presses against tissue walls. In some embodiments, the stiffening ring 2938 can be made of the same material as the rest of the bulb 2937, but can be of added thickness.

In some embodiments, the bulb 2937 can be configured to inflate and deflate only with the air from a balance chamber 2940. The balance chamber 2940 can be a thin sleeve or balloon that is made of a very thin and soft durometer material. The balance chamber 2940 can be configured to accept air from the bulb 2937 only if the bulb 2937 is compressed. The size or length of the balance chamber 2940 can be optimized such that compressing the bulb 2937 will not cause the diameter of the balance chamber 2940 to grow larger than the bulb 2937. A channel between the balance chamber 2940 and the bulb 2937 can allow for air to flow back and form between the balance chamber 2940 and the bulb 2937 as the bulb 2937 transitions back to its native shape (e.g., after the release of compression caused during insertion of the device). The sealed bulb 2937 and balance chamber 2940 can advantageously be easy to clean and sterilize if multiple uses are desired.

In other embodiments, the bulb 2937 can be inflated via an inflation lumen. In yet other embodiments, the bulb 2937 can be inflated by introducing air through a vent or hole in the proximal end of the bulb 2937 (e.g., without having a balance chamber).

The systems, devices, and methods described herein can advantageously pull a vacuum within the postpartum uterus to both clear blood from the uterus and aid in contracting the uterus, thereby stopping postpartum hemorrhaging.

In some embodiments, at least part of the systems and devices described herein can be transparent so as to allow visualization of the blood and fluid being suctioned from the uterus.

Vacuum can be applied through any of the devices described herein continuously for 1-24 hours or less inside the hemorrhaging uterus. In some embodiments, the uterus can be maintained in an isobaric state through the application of vacuum. In some embodiments, the bleeding can stop within less than 1 hour, such as less than 30 minutes, less than 20 minutes, less than 5 minutes, or less than 2 minutes.

Any of the devices described herein can be used without a separate seal member, i.e., the tissue can seal directly around the elongate body or shaft to seal the uterus.

Any of the devices described herein can include distal tips with soft rounded edges so as to be atraumatic during insertion.

Any of the devices described herein can have vacuum holes in the distal tips thereof (e.g., inline with the centerline of a vacuum lumen therethrough and/or inline with a centerline of two lumens). Such vacuum holes can advantageously help access blood and clots near the tip and/or facilitate easy cleaning (e.g., with a wire brush) down the tip of the device.

Any of the devices described herein can be flexible to conform to local anatomy.

Any of the devices described herein can be more flexible along a first axis than a second axis. For example, the devices can be more flexible along an axis perpendicular to the coronal plane than along an axis perpendicular to sagittal plane, which can advantageously help the device conform to the natural upward angle of the uterus. Alternatively, any of the devices described herein can have equivalent flexibilities along an axis perpendicular to the coronal plane and along an axis perpendicular to sagittal plane, e.g., to allow placement of the device in the uterus with indifference to orientation.

It should be understood that any element(s) described herein with respect to one embodiment can be substituted for or used in addition to any element(s) described herein with respect to another embodiment.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An anti-hemorrhaging device, comprising:
    a proximal portion comprising a shaft housing a central vacuum channel and a connector at a proximal opening configured to connect the central vacuum channel to a vacuum source;
    a distal portion connected to the proximal portion; the distal portion comprising:
        a first elongate tube having a first vacuum channel;
        a second elongate tube having a second vacuum channel, the first vacuum channel and the second vacuum channel being in fluidic communication with the central vacuum channel of the proximal portion; the second elongate tube joined with and extending side-by-side in parallel to the first elongate tube and defining at least one crevice in an outer surface of the distal portion extending along a longitudinal axis; and
        a plurality of holes positioned along the at least one crevice and extending from the outer surface to an inner surface of both the first channel and the second-channel, wherein activation of the vacuum source is configured to pull vacuum through the central vacuum channel of the proximal portion, and the first vacuum channel, the second vacuum channel and the plurality of holes of the distal portion so as to collapse a uterus upon insertion of the device into the uterus; and
    a seal located on the longitudinal axis between the proximal portion and the distal portion.

2. The anti-hemorrhaging device of claim 1, wherein the seal is inflatable including an inflation channel connected to the seal and extending along the proximal portion.

3. The anti-hemorrhaging device of claim 2, wherein the seal has a central disk portion and tapered proximal and distal ends.

4. The anti-hemorrhaging device of claim 1, wherein the seal is an invertible umbrella-shaped diaphragm seal.

5. The anti-hemorrhaging device of claim 4, wherein the seal includes an outer ring having a thickness greater than a skirt of the seal.

6. The anti-hemorrhaging device of claim 1, wherein each of the plurality of holes has an elongated shape with a length along the longitudinal axis longer than a width.

7. The anti-hemorrhaging device of claim 1, wherein the at least one crevice has a depth of between 0.02" and 0.2".

8. The anti-hemorrhaging device of claim 1, wherein an angle of the at least one crevice is between 10 and 80 degrees.

9. The anti-hemorrhaging device of claim 1, wherein a ratio of a width of the first and second elongate tubes to a height of the first and second elongate tubes is between 1.4 and 2.3, the width and height perpendicular to the at least one crevice.

10. The anti-hemorrhaging device of claim 1, wherein a ratio of a height of the first and second elongate tubes to a width of the first and second elongate tubes is between 1.4 and 2.3, the width and height perpendicular to the at least one crevice.

11. The anti-hemorrhaging device of claim 1, wherein a ratio of a height of the first and second elongate tubes to a width of the first and second elongate tubes is approximately 1, the width and height perpendicular to the at least one crevice.

12. The anti-hemorrhaging device of claim 1, wherein each of the plurality of holes extends completely through the at least one crevice from the outer surface to a second opposite outer surface of the device.

13. The anti-hemorrhaging device of claim 1, wherein the distal portion further comprises a tapered distal tip.

14. The anti-hemorrhaging device of claim 1 wherein the plurality of holes is configured to provide preferential directional bending for the distal portion.

* * * * *